US011205450B2

(12) United States Patent
Calfee et al.

(10) Patent No.: US 11,205,450 B2
(45) Date of Patent: Dec. 21, 2021

(54) SPLIT-ACTUATOR DISK DRIVE THAT USES MICROACTUATOR FEEDFORWARD TO REDUCE EFFECTS OF CROSS-ACTUATOR COUPLING

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Gary W. Calfee, Santa Clara, CA (US); Richard M. Ehrlich, Saratoga, CA (US); Thorsten Schmidt, Livermore, CA (US); Gabor Szita, Mountain View, CA (US)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/879,690

(22) Filed: May 20, 2020

(65) Prior Publication Data
US 2021/0366512 A1  Nov. 25, 2021

(51) Int. Cl.
*G11B 5/596* (2006.01)
*G11B 5/48* (2006.01)

(52) U.S. Cl.
CPC ........ *G11B 5/59622* (2013.01); *G11B 5/4813* (2013.01)

(58) Field of Classification Search
CPC .................................. G11B 5/55; G11B 5/596
See application file for complete search history.

(56) References Cited

U.S. PATENT DOCUMENTS

| | | | |
|---|---|---|---|
| 6,493,172 B1 | 12/2002 | Morris et al. | |
| 6,519,109 B1 | 2/2003 | Price et al. | |
| 7,106,537 B1* | 9/2006 | Bennett | G11B 5/553 360/69 |
| 7,315,429 B2* | 1/2008 | van Zyl | G11B 5/4806 360/61 |
| 7,576,940 B2* | 8/2009 | Lee | G11B 5/5552 360/77.02 |
| 9,361,919 B1* | 6/2016 | Lieu | G11B 5/556 |
| 9,792,938 B1 | 10/2017 | Kobayashi et al. | |
| 9,911,442 B1* | 3/2018 | Kharisov | G11B 5/5552 |
| 9,934,803 B1* | 4/2018 | Semba | G11B 5/5578 |

(Continued)

*Primary Examiner* — K. Wong
(74) *Attorney, Agent, or Firm* — Kim & Stewart LLP

(57) ABSTRACT

In a multi-actuator drive, the effect of moving a first actuator (the so-called "aggressor actuator") in on a second actuator (the so-called "victim actuator") is reduced or compensated for. A victim feedforward signal is added to a microactuator control signal of the victim actuator in response to a voice-coil motor (VCM) control signal that is applied to the aggressor actuator. The feedforward signal is configured to compensate for disturbances to the victim microactuator caused by VCM commands provided to the aggressor actuator. The feedforward signal is based on a transfer function that models commands added to the victim microactuator, which is coupled to the head of the victim actuator, as a function of the aggressor VCM control signal applied to the aggressor actuator.

20 Claims, 10 Drawing Sheets

(56) References Cited

U.S. PATENT DOCUMENTS

| | | |
|---|---|---|
| 10,192,576 B1 | 1/2019 | Gaertner et al. |
| 10,720,200 B2 * | 7/2020 | Dallmann ............... G06F 12/10 |
| 10,741,210 B1 * | 8/2020 | Hillukka .............. G11B 5/5521 |
| 10,839,840 B2 * | 11/2020 | Takada .................. G06F 3/0676 |

* cited by examiner

SPLIT-ACTUATOR DISK DRIVE THAT USES MICROACTUATOR FEEDFORWARD TO REDUCE EFFECTS OF CROSS-ACTUATOR COUPLING

BACKGROUND

Magnetic hard disk drives (HDDs) have been employed in information technology as a low-cost means for providing random access to large quantities of data. As the need for data storage has expanded, the areal density of information stored in HDDs has continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of the magnetic heads when both actuators can be in motion. For example, when one actuator is seeking to a targeted data track, the high accelerations and changes in acceleration of the actuator can generate vibrations which will significantly affect the positioning accuracy of the other actuator while the other actuator is track following. Consequently, there is a need in the art for reducing the effect of one actuator in a multi-actuator drive on the positioning accuracy of another actuator in the multi-actuator drive.

SUMMARY

One or more embodiments provide systems and methods for reducing or compensating for the effect of moving a first actuator (the so-called "aggressor actuator") in a multi-actuator drive on a second actuator (the so-called "victim actuator") in the drive. Specifically, a victim feedforward signal is added to a microactuator control signal of the victim actuator in response to a voice-coil motor (VCM) control signal that is applied to the aggressor actuator, where the feedforward signal is configured to compensate for disturbances to the victim microactuator caused by VCM commands provided to the aggressor actuator. In the embodiments, the feedforward signal is based on a transfer function that models commands added to the victim microactuator, which is coupled to the head of the victim actuator, as a function of the aggressor VCM control signal applied to the aggressor actuator. In some embodiments, the transfer function is determined as the ratio of two transfer functions that can be directly measured in the multi-actuator drive: (1) a transfer function modeling a radial position of a head of the victim actuator as a function of the VCM control signal when applied to the aggressor actuator and (2) a transfer function modeling a radial position of the head of the victim actuator as a function of commands injected into commands for the victim microactuator.

According to an embodiment, a method is provided of manufacturing a disk drive that includes a magnetic disk; first and second heads; a first microactuator configured to move the first head relative to the magnetic disk; a second microactuator configured to move the second head relative to the magnetic disk; a first arm that is coupled to a first voice coil motor (VCM) and to which the first head and the first microactuator are mounted; a second arm that is coupled to a second VCM and to which the second head and the second microactuator are mounted; a first controller, a second controller, a third controller, and a notch filter. The first controller is configured to generate a first control signal for moving the first arm and a second control signal for the first microactuator in response to a first position signal generated by the first head. The second controller is configured to generate a third control signal for moving the second arm and a fourth control signal for the second microactuator, in response to a second position signal generated by the second head. The third controller is configured to generate a feedforward correction signal for modifying the second control signal. The notch filter is between the first microactuator and the first controller and is configured to generate a fifth control signal for the first microactuator from the second control signal and the feedforward correction signal. According to the embodiment, the method comprises determining a first transfer function that models the feedforward correction signal as a function of the third control signal; and modifying the third controller to generate the feedforward correction signal based on the first transfer function.

A disk drive, according to another embodiment, comprises a magnetic disk; first and second heads; a first microactuator configured to move the first head relative to the magnetic disk; a second microactuator configured to move the second head relative to the magnetic disk; a first arm to which the first head and the first microactuator are mounted; a second arm to which the second head and the second microactuator are mounted; a notch filter; and a first controller, a second controller, and a third controller. The first controller is configured to generate a first control signal for moving the first arm and a second control signal for the first microactuator, in response to a first position signal generated by the first head. The second controller is configured to generate a third control signal for moving the second arm and a fourth control signal for the second microactuator, in response to a second position signal generated by the second head. The third controller is configured to generate a feedforward correction signal for modifying the second control signal, wherein the feedforward correction signal is generated based on a first transfer function that models the feedforward correction signal as a function of the third control signal.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
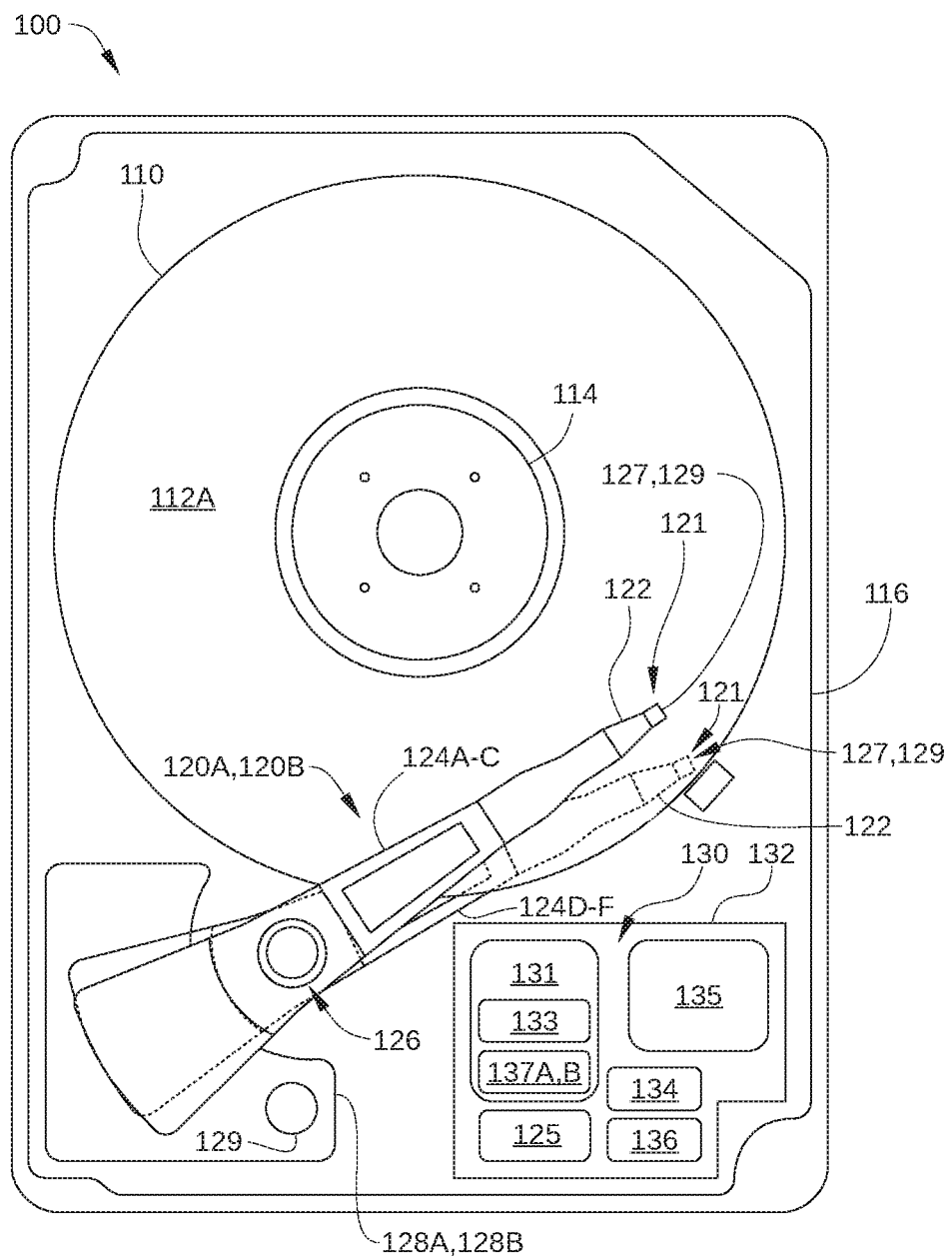
FIG. 1 is a schematic view of an exemplary hard disk drive, according to an embodiment.

FIG. 1 is a schematic view of an exemplary hard disk drive (HDD) 100, according to one embodiment. For clarity, HDD 100 is illustrated without a top cover. HDD 100 is a multiple actuator drive, and includes one or more storage disks 110, each including one or two recording surfaces on which a plurality of concentric data storage tracks are disposed. In FIG. 1, only the top recording surface 112A of storage disk 110 is visible. The one or more storage disks 110 are coupled to and rotated by a spindle motor 114 that is mounted on a base plate 116. Two or more actuator arm assemblies 120A and 120B are also mounted on base plate 116, and each of the assemblies includes one or more arm-mounted sliders 121 with one or more magnetic read/write heads 127 that read data from and write data to the data storage tracks of an associated recording surface, such as recording surface 112A.

One or more actuator arms 124 are included in actuator arm assembly 120A, and one or more actuator arms 124 are included in actuator arm assembly 120B. Actuator arm assembly 120A and the one or more actuator arms 124 included therein are rotated together about a bearing assembly 126 by a voice coil motor (VCM) 128A independently from actuator arm assembly 120B. Likewise, actuator arm assembly 120B and the one or more actuator arms 124 included therein are rotated together about bearing assembly 126 by a VCM 128B independently from actuator arm assembly 120A. Thus, each of VCMs 128A and 128B moves a group of the sliders 121 and read/write heads 127 radially relative to a respective recording surface of a storage disk 110 included in HDD 100, thereby providing radial positioning of a corresponding read/write head 127 over a desired concentric data on a recording surface, for example on recording surface 112A. Spindle motor 114, the read/write heads 127, and VCMs 128A and 128B are coupled to electronic circuits 130, which are mounted on a printed circuit board 132.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing coarse control of the radial position of the actuator arm assembly and the attached read/write head with respect to the particular storage disk 110.

Fine radial positioning of each read/write head 127 is accomplished with a respective microactuator 129. The microactuator 129 for each read/write head 127 is mechanically coupled to the actuator arm 124 that corresponds to the read/write head 127. Each microactuator 129 typically includes one or more piezoelectric elements and is configured to move a corresponding read/write head 127 radially a small distance, for example on the order of a few tens or hundreds of nanometers. When employed together, microactuators 129 and voice coil motors 128A and 128B are sometimes referred to as dual-stage actuators, where voice coil motor 128A or 128B is the prime mover and each microactuator 129 is a second-stage actuator. Dual-stage actuators enable the servo system of HDD 100 to attain more accurate tracking control.

In some embodiments, each microactuator 129 is mounted on a respective flexure arm 122, at a gimbal between the respective flexure arm 122 and the corresponding slider 121. In such embodiments, each microactuator 129 rotates the corresponding slider 121, causing radial motion (relative to corresponding recording surface) of the corresponding read/write head 127. Alternatively or additionally, in some embodiments, each microactuator 129 is mounted on an end of an actuator arm 124 or on the flexure arm, itself, and moves the flexure arm 122 through a relatively large arc, for example on the order of a hundred track widths. In yet other embodiments, each microactuator 129 includes a first piezoelectric or other movable element at the gimbal between the respective flexure arm 122 and the corresponding slider 121 and a second piezoelectric or other movable element at the end of the actuator arm 124 or on the flexure arm. In such embodiments, each read/write head 127 is provided with three-stage actuation in the radial direction.

In the embodiment illustrated in FIG. 1, only one slider 121, one flexure arm 122, one actuator arm 124, and one read/write head 127 are shown for actuator arm assembly 120A and only one slider 121, one flexure arm 122, one actuator arm 124, and one read/write head 127 are shown for actuator arm assembly 120B. In other embodiments, each of actuator arm assemblies 120A and 120B can include a plurality of actuator arms, sliders, flexure arms, and read/write heads. Further, in some embodiments, HDD 100 can include more than two actuator arm assemblies, each rotated about bearing assembly 126 by a respective VCM independently from each other. In other embodiments, additional actuators may rotate about other bearing assemblies.

Figure 2:
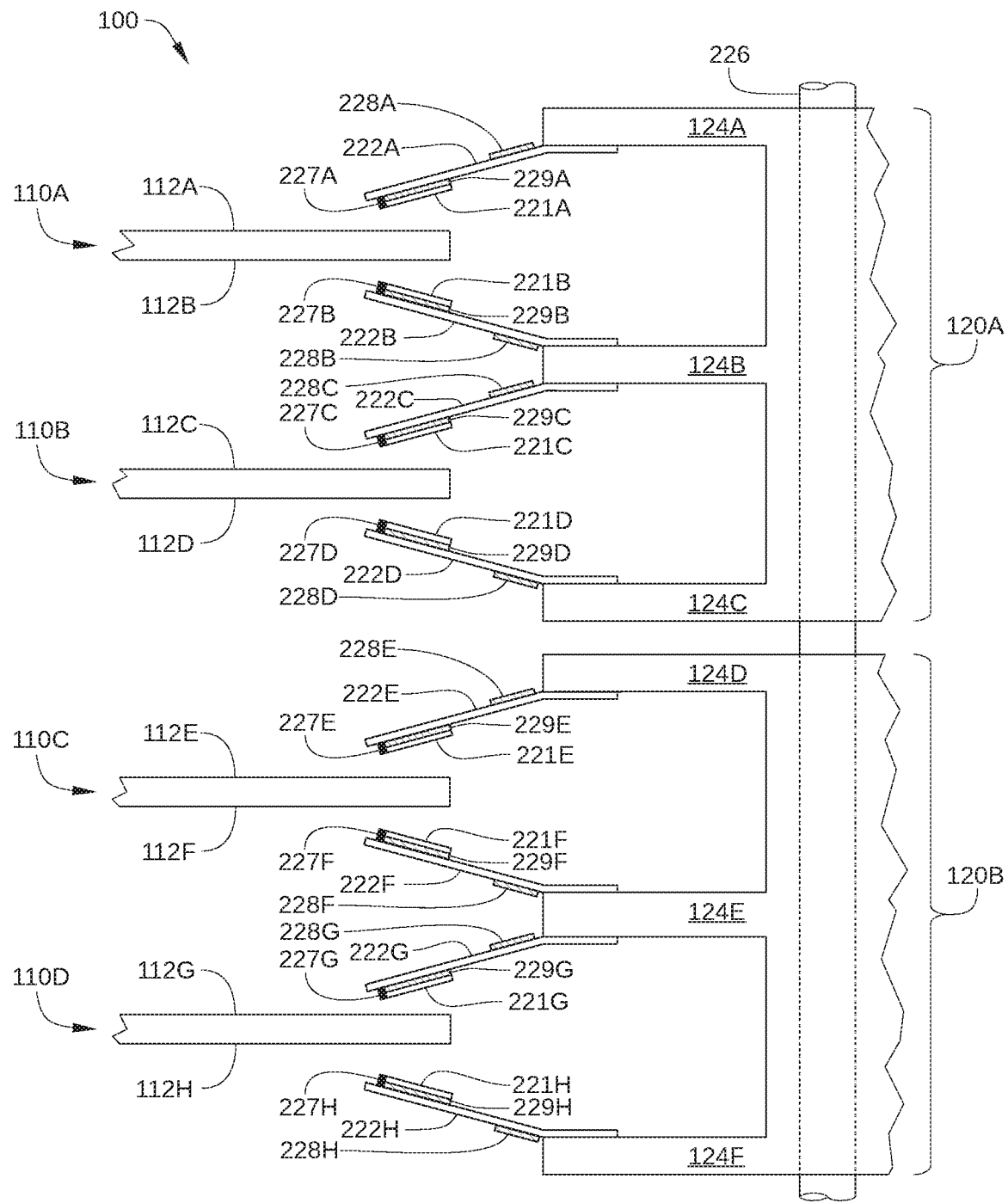
FIG. 2 schematically illustrates a partial side-view of multiple storage disks and two independent actuator arm assemblies of the hard disk drive of FIG. 1.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 227A, 227B, 227C, and 227D), and the recording surfaces of multiple storage disks 110C and 110D are each accessed by the read/write heads included in the independent actuator arm assembly 120B (e.g., read/write heads 227E, 227F, 227G, and 227H). Thus, in the embodiment illustrated in FIG. 2, HDD 100 is configured with multiple storage disks 110A-110D having a total of eight recording surfaces 112A-112H and multiple read/write heads 227A-227H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 227A reads data from and writes data to recording surface 112A, read/write head 227B reads data from and writes data to corresponding recording surface 112B, and so on.

Read/write heads 227A-227H are disposed on sliders 221A-221H, respectively, and sliders 221A-221H (referred to collectively herein as sliders 221) are respectively coupled to actuator arms 124A-124F via flexure arms 222A-222H (referred to collectively herein as flexure arms 222) as shown. In some embodiments, each of sliders 221A-221H is mounted on a corresponding one of flexure arms 222 via a microactuator 229A-229H (referred to collectively herein as microactuators 229), such as a micro-actuator (MA) second stage that includes two Lead zirconate titanate piezoelectric actuators attached to a baseplate of the corresponding flexure arm 222. Alternatively, in some embodiments, each of sliders 221A-221H is mounted directly on a corresponding one of flexure arms 222.

In the embodiment illustrated in FIG. 2, flexure arm 222A is coupled to an actuator arm 124A, flexure arms 222B and 222C are coupled to an actuator arm 124B, flexure arm 222D is coupled to an actuator arm 124C, flexure arm 222E is coupled to an actuator arm 124D, flexure arms 222F and 222G are coupled to an actuator arm 124E, and flexure arm 222H is coupled to an actuator arm 124F. Actuator arms 124A-124F are referred to collectively herein as actuator arms 124. In the embodiment illustrated in FIG. 2, each of microactuators 228A-228H (referred to collectively herein as microactuators 228) is disposed at a base of flexure arms 222A-222H, respectively, i.e., at an end of one of actuator arms 124. Alternatively or additionally, in some embodiments, microactuators 229A-229H can be disposed proximate sliders 221A-221H, respectively, i.e., at a tip of flexure arms 222A-222H, respectively. In embodiments in which microactuators 229 are disposed proximate sliders 221, each of microactuators 229 can include a gimbal microactuator. In either case, each of microactuators 229 and/or 228 compensates for perturbations in the radial position of sliders 221, so that read/write heads 227A-227H follow the proper data track on recording surfaces 112. Thus, microactuators 229 can compensate for vibrations of the disk, inertial events such as impacts to HDD 100, and irregularities in recording surfaces 112 or in the written servo-pattern.

Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226).

In the embodiment illustrated in FIG. 2, HDD 100 is depicted with two actuator arm assemblies (120A and 120B) and four storage disks (110A-110D), where the movement of each actuator arm assembly is controlled by a different actuator (e.g., VCM 128A and 128B). In other embodiments, HDD 100 may include any technically feasible combination of actuator arm assemblies and storage disks. For example, in one embodiment, HDD 100 includes three actuator arm assemblies 120 (with a total of 12 read/write heads 127), which are each controlled by a different actuator, and six storage disks 110 (with a total of 12 recording surfaces 112). In such an embodiment, each such actuator can be configured to control the movement of four read/write heads 127. In another embodiment, HDD 100 includes two actuator arm assemblies (with a total of 10 read/write heads 127), which are each controlled by a different actuator, and five storage disks 112, (with a total of 10 recording surfaces 112). In such an embodiment, each such actuator controls the movement of five read/write heads 127. Thus, in such an embodiment, a middle storage disk is accessed on one recording surface by a head controlled by one actuator and on the other surface by a head controlled by a different actuator.

Returning to FIG. 1, electronic circuits 130 include read channels 137A and 137B, a microprocessor-based controller 133, random-access memory (RAM) 134 (which may be a dynamic RAM and is used as one or more data buffers) and/or a flash memory device 135, and, in some embodiments, a flash manager device 136. In some embodiments, read channels 137A and 137B and microprocessor-based controller 133 are included in a single chip, such as a system-on-chip (SoC) 131. HDD 100 further includes a motor-driver chip 125 that accepts commands from microprocessor-based controller 133 and drives spindle motor 114, and VCMs 128A and 128B and microactuators 228 and/or 229 (not shown in FIG. 1). Via a preamplifier (not shown), read/write channel 137A communicates with read/write heads 127 of actuator arm assembly 120A and read/write channel 137B communicates with read/write heads 127 of actuator arm assembly 120B. The preamplifiers are mounted on a flex-cable, which is mounted on either base plate 116, one of actuators 120A or 120B, or both. Electronic circuits 130 and motor-driver chip 125 are described below in greater detail in conjunction with FIG. 3.

Figure 3:
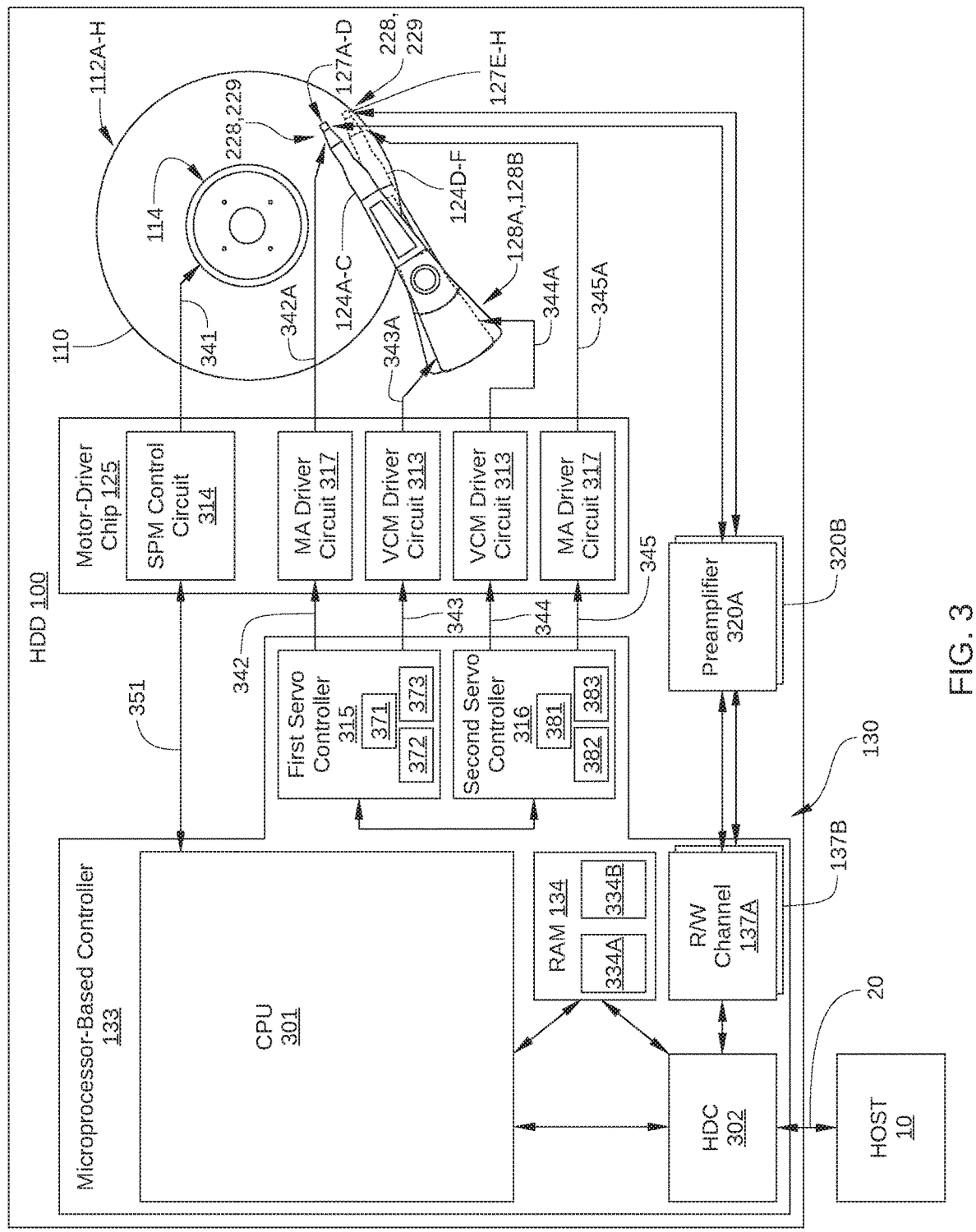
FIG. 3 illustrates an operational diagram of the hard disk drive of FIG. 1, with some elements of electronic circuits and a motor-driver chip shown configured according to one embodiment.

FIG. 3 illustrates an operational diagram of HDD 100, with some elements of electronic circuits 130 and motor-driver chip 125 shown configured according to one embodiment. HDD 100 is connected to a host 10, such as a host computer, via a host interface 20, such as a serial advanced technology attachment (SATA) bus or a Serial Attached Small Computer System Interface (SAS) bus. As shown, microprocessor-based controller 133 includes one or more central processing units (CPU) 301 or other processors, a first servo controller 315, and a second servo controller 316, a hard disk controller (HDC) 302, a DRAM 134, and read/write channels 137A and 137B. Motor-driver chip 125 includes VCM driver circuits 313, MA driver circuits 317, and a spindle motor (SPM) control circuit 314. DRAM 134 may be integrated on the same die as the controller 133, included in a separate die in the same package as the controller 133, or included in a separate package mounted on circuit board 130.

HDD 100 further includes preamplifiers 320A and 320B, which can be each mounted on actuator arm assemblies 120A and 120B or elsewhere within the head and disk assembly (HDA) of HDD 100. Preamplifier 320A supplies a write signal (e.g., current) to read/write head 127A in response to write data input from read/write channel 137A.

Similarly, preamplifier 320B supplies a write signal (e.g., current) to read/write head 127B in response to write data input from read/write channel 137B. In addition, preamplifier 320A amplifies a read signal output from to read/write head 127A and transmits the amplified read signal to read/write channel 137A, and preamplifier 320B amplifies a read signal output from to read/write head 127B and transmits the amplified read signal to read/write channel 137B.

CPU 301 controls HDD 100, for example according to firmware stored in flash memory device 135 or another nonvolatile memory, such as portions of recording surfaces 112A-112H. For example, CPU 301 manages various processes performed by HDC 302, read/write channels 137A and 137B, read/write heads 127A-127H, recording surfaces 112A-112H, and/or motor-driver chip 125. Such processes include a writing process for writing data onto recording surfaces 112A-112H and a reading process for reading data from recording surfaces 112A-112H.

In the embodiment illustrated in FIG. 3, microprocessor-based controller 133 includes a single CPU 301 incorporated into a single SoC 131. In alternative embodiments, microprocessor-based controller 133 includes more than one CPU. In such embodiments, HDD 100 can include two CPUs; one devoted to servo/spindle control and the other devoted to a combination of host-based and disk-control activities. In other alternate embodiments, HDD 100 can include a CPU and one or more separate servo controllers, such as first servo controller 315 and second servo controller 316 shown in FIG. 3. Alternatively or additionally, in some embodiments, HDD 100 includes a separate SoC for each actuator, where each SoC has two such CPUs. Further, in some embodiments, microprocessor-based controller 133 includes multiple motor driver chips. For instance, in one such embodiment, a first motor driver chip is dedicated for controlling the spindle motor, a first actuator, and a first microactuator while a second motor driver chip is dedicated for controlling a second actuator and a second microactuator.

Read/write channels 137A and 137B are signal processing circuits that encode write data input from HDC 302 and output the encoded write data to respective preamplifiers 320A and 320B. Read/write channels 137A and 137B also decode read signals transmitted from respective preamplifiers 320A and 320B into read data that are outputted to HDC 302. In some embodiments, read/write channels 137A and 137B each include a single read channel and a single write channel, whereas in other embodiments, read/write channels 137A and 137B each include multiple write channels and/or multiple read channels for read/write heads 127A-127H. HDC 302 controls access to DRAM 134 by CPU 301, read/write channels 137A and 137B, and host 10, and receives/transmits data from/to host 10 via interface 20. In some embodiments, the components of microprocessor-based controller 133 (e.g., CPU 301, HDC 302, DRAM 134, and read/write channels 137A, 137B) are implemented as a one-chip integrated circuit (i.e., as an SoC). Alternatively, one or more of CPU 301, HDC 302, DRAM 134, and read/write channels 137A and 137B can each be implemented as a separate chip.

Motor-driver chip 125 drives the spindle motor 114, a first actuator (that includes VCM 128A, actuator arms 124A-124C, and bearing assembly 126), and a second actuator (that includes VCM 128B, actuator arms 124D-124F, and bearing assembly 126). A first VCM driver circuit 313 of motor-driver chip 125 generates an amplified control signal 343A in response to control signals 343 from first servo controller 315, and a second VCM driver circuit 313 of motor-driver chip 125 generates an amplified control signal 344A in response to control signals 344 from second servo controller 316. Control signals 343 enable execution of disk access commands received from host 10 that are to be executed by a first servo system of HDD 100 that includes VCM 128A and control signals 344 enable execution of disk access commands received from host 10 that are to be executed by a second servo system of HDD 100 that includes VCM 128B. MA driver circuits 317 (in some embodiments included in motor-driver chip 125) generate amplified second-stage control signals 342A and 345A in response to control signals 342 and 345 (which are control values for microactuators 228 and/or microactuators 229), respectively. Control signals 342 and 345 are generated by first servo controller 315 and second servo controller 316, respectively. Thus, a first MA driver circuit 317 generates amplified second-stage control signal 342A for microactuators 228 and/or 229 associated with actuator arm assembly 120A, and a second MA driver circuit 317 generates amplified second-stage control signal 345A for microactuators 228 and/or 229 associated with actuator arm assembly 120B.

SPM control circuit 314 generates a drive signal 341 (a drive voltage or a drive current) in response to a control signal 351 received from the CPU 301 and feedback from the spindle motor 114, and supplies drive signal 341 to spindle motor 114. In this way, spindle motor 114 rotates storage disks 110A-110D.

First servo controller 315 generates a VCM control signal 343 (drive voltage or drive current) and a microactuator control signal 342 (drive voltage or drive current), and supplies VCM control signal 343 to the first actuator (VCM 128A) via a VCM driver circuit 313 and microactuator control signal 342 to a suitable microactuator 228 or 229 via preamplifier 320A. In this way, first servo controller 315 positions read/write heads 127A-127D radially relative to a corresponding one of recording surfaces 112A-112D. In some embodiments, first servo controller 315 includes a fine servo controller 371 that generates microactuator control signal 342, a coarse servo controller 372 that generates VCM control signal 343, and a feedforward signal generator 373 that generates a feedforward signal (not shown in FIG. 3) for modifying microactuator control signal 342.

In some embodiments, the CPU 301 generates a feedforward signal for modifying microactuator signal 342. In some embodiments first servo controller 315 and second servo controller 316 are implemented in whole or in part in firmware running on CPU 301. In embodiments in which microprocessor-based controller 133 includes multiple CPUs, such firmware can run on one or more of the multiple CPUs.

Second servo controller 316 generates a VCM control signal 344 (drive voltage or drive current) and a microactuator control signal 345 (drive voltage or drive current), and supplies VCM control signal 344 to the second actuator (VCM 128B) via a VCM driver circuit 313 and microactuator control signal 345 to a suitable microactuator 228 or 229 via MA driver circuit 317. In this way, second servo controller 316 positions read/write heads 127E-127H radially with respect to a corresponding one of recording surface 112E-127H. In some embodiments, second servo controller 316 includes a fine servo controller 381 that generates microactuator control signal 345, a coarse servo controller 382 that generates VCM control signal 344 and a feedforward signal generator 383 that generates a feedforward signal (not shown in FIG. 3) for modifying microactuator control signal 345.

In an embodiment, the first servo system of HDD 100 (e.g., CPU 301, read/write channel 137A, preamplifier 320A, first servo controller 315, voice-coil motor 128A, and a suitable microactuator 228 or 229) performs positioning of a read/write head 127 included in actuator arm assembly 120A (e.g., read/write head 127A) over a corresponding recording surface (e.g., recording surface 112A), during which CPU 301 determines an appropriate current to drive through the voice coil of VCM 128A. Typically, the appropriate current is determined based in part on a position feedback signal of the read/write head, i.e., a position error signal (PES). Similarly, the second servo system of HDD 100 (e.g., CPU 301, read/write channel 137B, preamplifier 320B, second servo controller 316, voice-coil motor 128B, and a suitable microactuator 228 or 229) performs positioning of a read/write head 127 included in actuator arm assembly 120B (e.g., read/write head 127D) over a corresponding recording surface (e.g., recording surface 112D), during which CPU 301 determines an appropriate current to drive through the voice coil of VCM 128B. Although a single CPU 301 is shown here, it is possible that multiple CPUs might be used (for example, one or more CPUs for each actuator).

In the embodiment illustrated in FIG. 3, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

Feedforward Control Signal Based on Aggressor Operation

As noted previously, when one actuator of a multiple-actuator HDD (the so-called "aggressor actuator") is seeking to a targeted data storage track, cross-actuator coupling can generate vibrations which will significantly affect the positioning accuracy of the other actuator (the so-called "victim actuator"). In particular, the high accelerations and changes in acceleration of the aggressor actuator are likely to affect the positioning accuracy of the victim actuator when the victim actuator is attempting to closely follow a specific data track, for example during a read or write operation. According to various embodiments described herein, a feedforward control signal is implemented to reduce or compensate for the effect on the victim actuator when moving the aggressor actuator. Specifically, the victim feedforward control signal is added to a microactuator control signal of the victim actuator in response to a VCM control signal that is applied to the aggressor actuator. Embodiments in which such a victim feedforward control signal is implemented are described below in conjunction with FIGS. 4A and 4B.

Figure 4A:
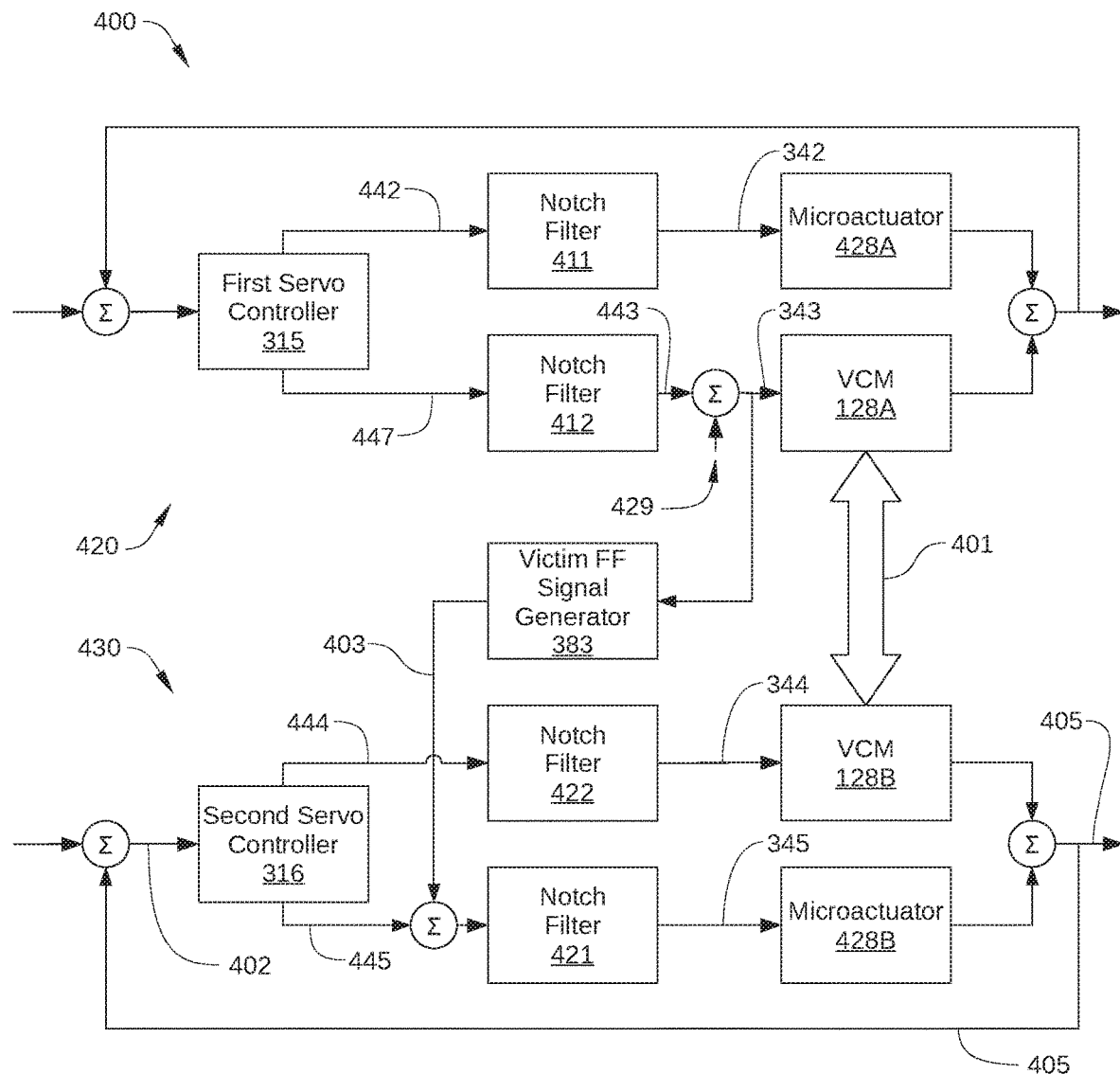
FIG. 4A is a control diagram illustrating the generation and application of a victim feedforward control signal in the hard disk drive of FIG. 1, according to an embodiment.

FIG. 4A is a control diagram 400 illustrating the generation and application of a victim feedforward control signal in HDD 100, according to various embodiments. As shown, HDD 100 includes a first control loop 420 associated with an aggressor actuator (in this example VCM 128A) and a second control loop 430 associated with a victim actuator (in this example VCM 128B).

First control loop 420 includes VCM 128A, a microactuator 428A for the currently active read/write head associated with VCM 128A, and first servo controller 315. In some embodiments, first control loop 420 further includes a notch filter 411 for modifying microactuator control signals 442 for microactuator 428A and/or a notch filter 412 for modifying VCM control signals 447 for VCM 128A to a filtered VCM control signal 443. In some embodiments, first control loop 420 also includes an injection point 429. Injection point 429 is a point in first control loop 420 at which a disturbance can be injected into control signals that are applied to VCM 128A (e.g., VCM control signal 343) as part of measuring a transfer function as described below in conjunction with FIG. 7.

Second control loop 430 includes VCM 128B, a microactuator 428B for the currently active head associated with VCM 128B, second servo controller 316, and feedforward signal generator 383. In some embodiments, second control loop 430 further includes a notch filter 421 for modifying microactuator control signals 445 for microactuator 428B and/or a notch filter 422 for modifying VCM control signals 444 for VCM 428B.

Figure 4B:
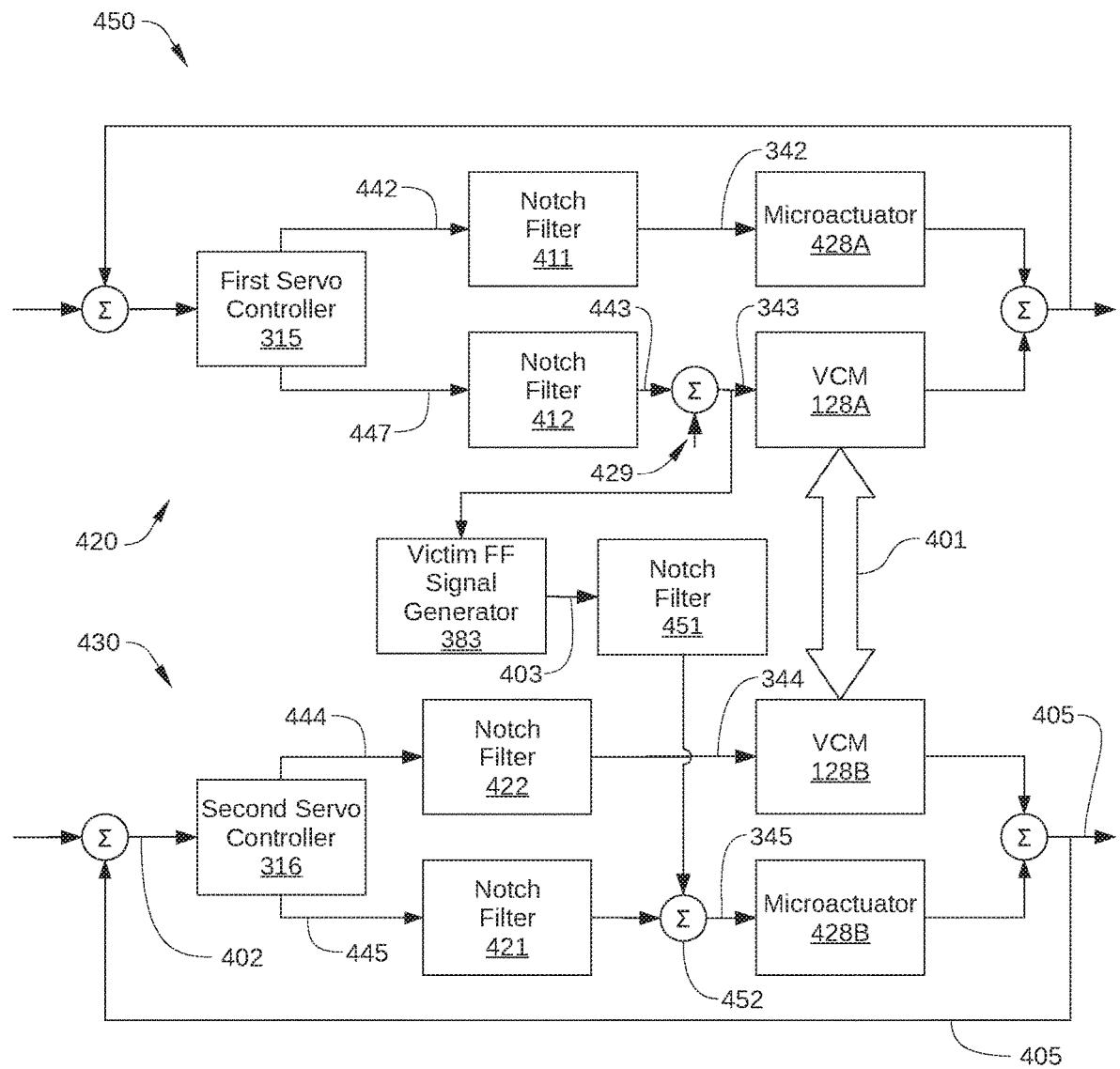
FIG. 4B is a control diagram illustrating the generation and application of a victim feedforward control signal in the hard disk drive of FIG. 1, according to another embodiment.

For clarity, VCM driver circuit 313 and MA driver circuit 317 are not shown in FIGS. 4A and 4B. Instead, the functionality of VCM driver circuit 313 is included in VCM 128A and 128B, while the functionality of MA driver circuit 317 is included in microactuator 428A and 428B.

During operation, first servo controller 315 generates VCM control signal 343 (or alternatively VCM control signal 447, on which VCM control signal 343 is based) for VCM 128A and microactuator control signal 342 (or alternatively microactuator control signal 442, on which microactuator control signal 342 is based) for microactuator 428A. Alternatively, CPU 301 generates microactuator control signal 342 for microactuator 428A. Because of mechanical coupling 401 between VCM 128A and VCM 128B, operations performed by VCM 128A in response to VCM control signal 343 cause a radial displacement of the currently active read/write head associated with VCM 128B. This radial displacement contributes to position error signal (PES) 402 based on the radial position 405 of the currently active read/write head associated with VCM 128B. According to various embodiments, feedforward signal generator 383 generates a victim feedforward signal 403 based on a transfer function, where the transfer function models commands added to microactuator control signal 345 for microactuator 428B (the victim microactuator) as a function of VCM control signal 343 for VCM 128A (the aggressor actuator). Feedforward signal generator 383 in second servo controller 316 receives information about VCM control signal 447 from first servo controller 315 via a communication link between first servo controller 315 and second servo controller 316 (shown in FIG. 3). Feedforward signal 403, when added to microactuator control signal 345 (or alternatively to microactuator control signal 445, on which microactuator control signal 345 is based), reduces or compensates for contributions to radial position 405 caused when VCM control signal 343 (which is based on VCM control signal 447) is applied to VCM 128A.

In some embodiments, the transfer function for determining feedforward signal 403, referred to herein as the feedforward transfer function, is determined as the ratio of two transfer functions that can be directly measured in the multi-actuator drive: a first transfer function modeling radial position 405 as a function of filtered VCM control signal 343 for VCM 128A and a second transfer function modeling radial position 405 as a function of commands 403 that are added to microactuator control signal 345. In such embodiments, the first and second transfer functions can be determined in HDD 100 as part of a calibration/start-up process or during factory tuning of the drive. For example, in one such embodiment, values associated with the first transfer function are determined by adding various values to filtered VCM control signal 443 and measuring the resultant radial position 405 of the victim read/write head. Similarly, values associated with the second transfer function are determined by adding various values of feedforward signal 403 to microactuator control signal 345 and measuring the resultant radial position 405 of the victim read/write head. In some embodiments, the second transfer function is determined by adding various values of feedforward signals directly to microactuator control signal 345. In alternative embodiments, the second transfer function is determined by adding various values of feedforward signals to the input of notch filter 421, the output of which is microactuator control signal 345. The latter embodiment is shown in FIG. 4A. The second transfer function is determined using the same injection point that will be used to inject feedforward during operation of the HDD 100.

In some embodiments, victim feedforward signal 403 is generated using a kernel that is derived based on the feedforward transfer function. In such embodiments, values associated with the feedforward transfer function are determined by taking a ratio of the above-described first and second transfer functions (e.g., the first transfer function divided by the second transfer function), where the kernel is the inverse discrete Fourier transform (DFT) of the values associated with the feedforward transfer function. Subsequently, feedforward signal generator 383 can convolve values for filtered VCM control signal 443 with the kernel to generate feedforward signal 403.

In the embodiment illustrated in FIG. 4A, VCM 128A is described as the aggressor actuator and VCM 128B is described as the victim actuator. In other instances, VCM 128B can operate as the aggressor actuator and VCM 128A can operate as the victim actuator. In such instances, feedforward signal generator 373 (shown in FIG. 3) generates a feedforward signal similar to feedforward signal 403 and provides that feedforward signal to microactuator 428A as a correction signal. In normal practice, VCM 128A and VCM 128B act as both the aggressor actuator and the victim actuator simultaneously.

In the embodiment illustrated in FIG. 4A, feedforward signal generator 383 is implemented as an element of HDD 100 that is separate from first servo controller 315 and second servo controller 316. Alternatively, feedforward signal generator 383 is implemented as a component of first servo controller 315, a component of second servo controller 316, or a component of both first servo controller 315 and second servo controller 316. Similarly, in instances in which VCM 128B is the aggressor actuator and VCM 128A is the victim actuator, feedforward signal generator 373 can be implemented as an element of HDD 100 that is separate from first servo controller 315 and second servo controller 316, as a component of first servo controller 315, a component of second servo controller 316, or a component of both first servo controller 315 and second servo controller 316.

In embodiments in which multiple read/write heads are coupled to a victim actuator, such as VCM 128A or VCM 128B, the above-described feedforward transfer function for determining feedforward signal 403 typically varies for each such read/write head. That is, mechanical coupling 401 between an aggressor actuator and a victim actuator can result in a different contribution to radial position 405 of a victim head, depending on the victim head. For example, referencing the embodiment illustrated in FIG. 2, actuation of actuator arm assembly 120A can affect radial position 405 for each of read/write heads 227E, 227F, 227G, and 227H differently. In such embodiments, a different feedforward transfer function for determining feedforward signal 403 is determined for each read/write head 127 included in HDD 100. A process for determining different feedforward transfer functions for each read/write head 127 of HDD 100 is described below in conjunction with FIG. 6.

In some embodiments, first control loop 420 includes notch filter 411 and/or notch filter 412 and second control loop 430 includes notch filter 421 and/or notch filter 422. In such embodiments, notch filters 412 and 422 may be bandstop filters configured to block or attenuate portions of input signals that are likely to excite one or more resonances in or associated with VCM 128A and 128B, respectively. For first control loop 420, properly-designed notch filters 411 and 412, in combination with other elements in first servo controller 315 and the mechanical system including microactuator 428A and VCM 128A, can result in a stable servo control-loop. Without the notch filters, the control loop 420 might be unstable, or only marginally stable. Similarly, for second control loop 430, properly-designed notch filters 421 and 422 facilitate a stable servo control-loop. For example, one or more bands of an input signal, such as VCM control signal 342 or 344, are reduced in amplitude when processed by notch filter 412 or 422. Notch filters 411 and 421 are configured to remove or reduce portions of input signals that are likely to excite one or more resonances in or associated with microactuators 428A-428D and 428E-428H, respectively and/or microactuators 429A-429D and 429E-429H, respectively.

In the embodiment described above, notch filters 411, 412, 421, and 422 are employed to eliminate or greatly attenuate certain frequency components. Alternatively or additionally, in some embodiments, one or more of notch filters 411, 412, 421, and 422 are configured to modify the phase of a signal and/or to increase the gain a signal at certain frequencies. Such filters are sometimes called "phase steering" or "loop-shaping" filters, and can be used to stabilize a system using calculations that are similar or identical to calculations included in notch filters that are designed to eliminate or greatly attenuate certain frequency components.

FIG. 4B is a control diagram 450 illustrating the generation and application of a victim feedforward control signal in HDD 100, according to various embodiments. Control diagram 450 is substantially similar to control diagram 400 in FIG. 4A, with two exceptions. First, control diagram 450 includes a notch filter 451 that is configured to process the output of victim feedforward signal generator 383, i.e., victim feedforward signal 403. Second, victim feedforward signal 403, after being modified by notch filter 451, is added to microactuator control signal 345 in a different location, i.e., a summer 452 disposed between notch filter 421 and microactuator 428A. Implementation of various embodiments of notch filters in a servo control loop of HDD 100 are described below in conjunction with FIGS. 5A and 5B.

Figure 5A:
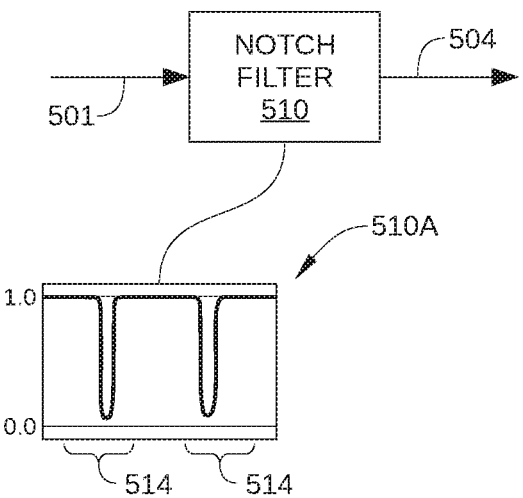
FIG. 5A schematically illustrates an implementation of a notch filter in a servo control loop of the hard disk drive of FIG. 1, according to an embodiment.

FIG. 5A schematically illustrates an implementation of a notch filter 510 in a servo control loop of HDD 100, according to an embodiment. For example, notch filter 510 can be implemented in first control loop 420 of FIG. 4A or 4B as notch filter 411, notch filter 412, and/or as notch filter 451. Alternatively or additionally, notch filter 510 can be implemented in second control loop 430 of FIG. 4A or 4B as notch filter 421 and/or as notch filter 422.

As shown, notch filter 510 receives an input signal 501. In some embodiments, input signal 501 can be a sum of a control signal and a correction signal. For example, in one such embodiment, input signal 501 corresponds to the sum of microactuator control signals 445 and victim feedforward signal 403 in FIG. 4A. Notch filter 510 is configured to reduce, block, or otherwise attenuate one or more frequency bands 514 of input signal 501. The above-described behavior of notch filter 510 is indicated graphically by a transfer function 510A and enables notch filter 510 to generate a filtered control signal 504. Thus, notch filter 510 is configured to prevent or reduce loop oscillations at certain frequencies, such as those associated with resonances of microactuators 228 or 229 or VCM 128A or 128B of FIG. 2.

Figure 5B:
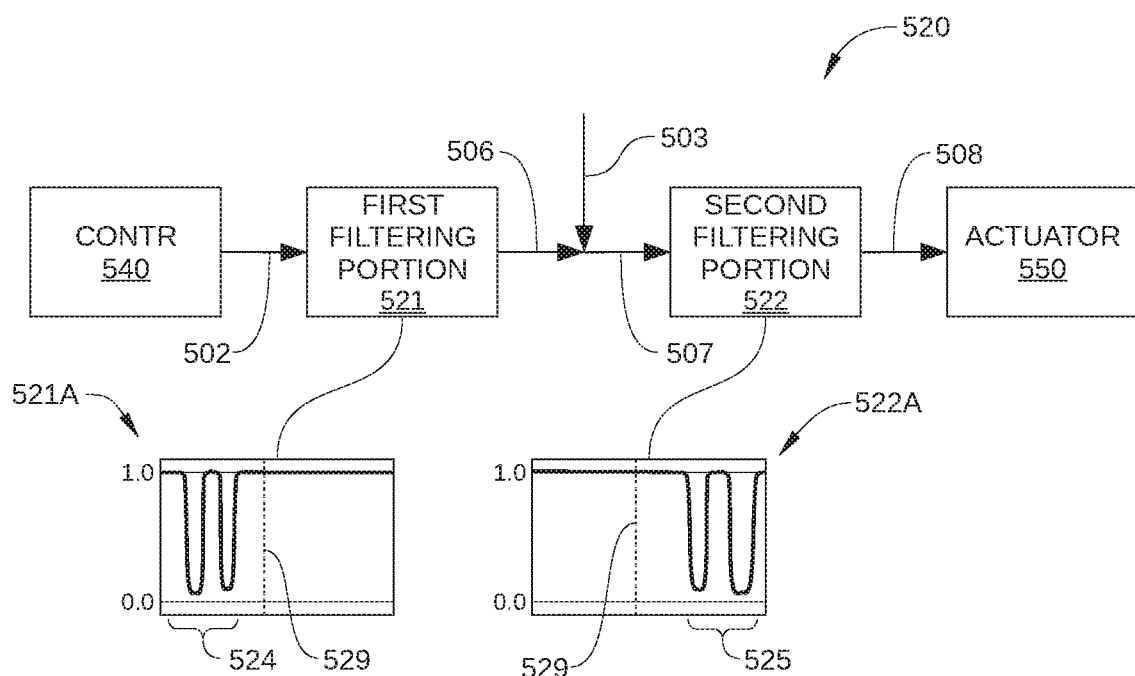
FIG. 5B schematically illustrates an implementation of a notch filter that includes multiple filtering portions in a servo control loop of the hard disk drive of FIG. 1, according to an embodiment.

FIG. 5B schematically illustrates an implementation in a servo control loop of HDD 100 of a notch filter 520 that includes multiple filtering portions, according to an embodiment. In some embodiments, notch filter 520 can be employed as one or more of the notch filters of first control loop 420 and/or second control loop 430 of FIG. 4A or 4B, such as notch filters 411, 412, 421 and/or 422. In the embodiment illustrated in FIG. 5B, notch filter 520 includes a first filtering portion 521 and a second filtering portion 522, where first filtering portion 521 functions as a first notch filter and second filtering portion 522 functions as a second notch filter in series with the first notch filter.

In the embodiment, first filtering portion 521 is disposed in a control loop between a controller 540 and second filtering portion 522. For example, controller 540 can correspond to first servo controller 315 or second servo controller 316 of FIG. 4A or 4B. Consequently, first filtering portion 521 is configured to process or modify an input signal 502 to generate a filtered control signal 506. For example, input signal 502 can be a microactuator control signal, such as microactuator control signal 442 or microactuator control signal 445 of FIG. 4A or 4B. By contrast, second filtering portion 522 is disposed in a control loop between first filtering portion 521 and an actuator 550, and is configured to generate a filtered corrected control signal 508 by processing or modifying an input signal 507. In the embodiment illustrated in FIG. 5B, input signal 507 is a combination of filtered control signal 506 and a correction signal 503. For example, correction signal 503 can be victim feedforward signal 403 of FIG. 4A or 4B and filtered corrected control signal 508 can be a microactuator control signal provided to a microactuator of HDD 100, such as microactuator control signal 345 for microactuator 428B in FIG. 4A or 4B.

As indicated by a transfer function 521A, first filtering portion 521 is configured to reduce, block, or otherwise attenuate one or more low-frequency bands 524 of input signal 502, where the low-frequency band or bands 524 are below a feedforward frequency threshold 529. The above-described behavior of first filtering portion 521 is indicated graphically by transfer function 521A and enables first filtering portion 521 to generate filtered control signal 506. Thus, first filtering portion 521 can prevent or reduce resonant oscillations at low frequencies in a servo loop. In a similar vein, a transfer function 522A indicates that second filtering portion 522 is configured to reduce, block, or otherwise attenuate one or more high-frequency bands 525 of an input signal, such as input signal 507, and generate a filtered corrected control signal 508 for actuator 550. In some embodiments, actuator 550 is one of microactuators 428A or 428B of FIG. 4A or 4B. As shown, corrected control signal 507 is based on a combination of correction signal 503 and filtered control signal 506, and the high-frequency band or bands 525 are above feedforward frequency threshold 529.

Because some low-frequency band or bands 524 may overlap with frequencies associated with correction signal 503, in some embodiments first filtering portion 521 does not receive and modify a corrected control signal that includes correction signal 503. Instead, second filtering portion 522 is configured to receive a signal that includes correction signal 503, such as corrected control signal 507. As a result, significant portions of a correction signal that are added to a microactuator control signal are less likely to be removed.

In the embodiment illustrated in FIG. 5B, first filtering portion 521 and second filtering portion 522 are each depicted as a single notch filter with two stop bands of low transmittance, such as low-frequency bands 524 in first filtering portion 521 and high-frequency bands 525 in second filtering portion 522. Alternatively, in some embodiments, first filtering portion 521 includes a plurality of notch filters that each include a stop band that is less than feedforward frequency threshold 529. Alternatively or additionally, in some embodiments, second filtering portion 522 includes a plurality of notch filters that each include a stop band that is greater than feedforward frequency threshold 529.

Figure 6:
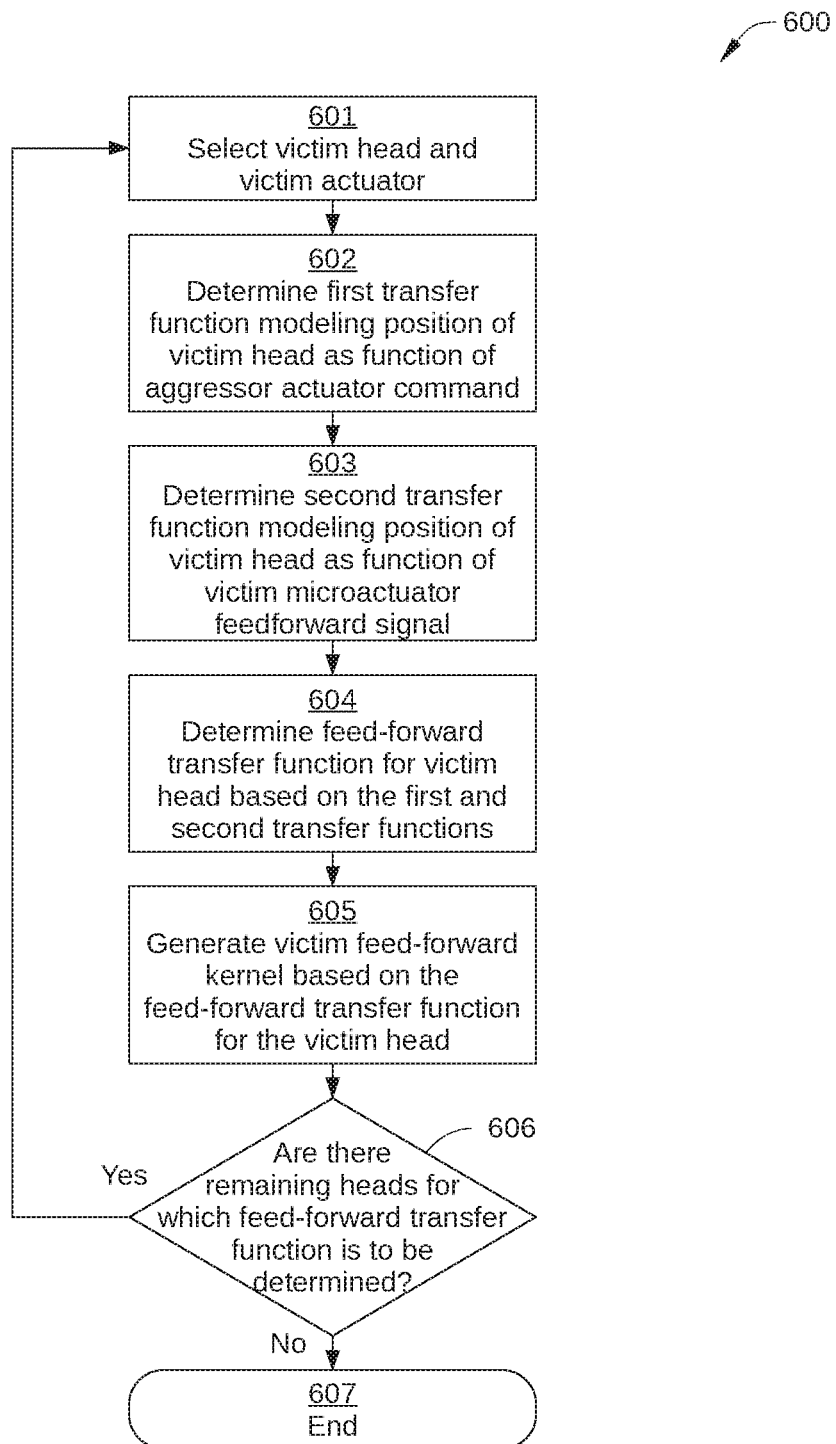
FIG. 6 sets forth a flowchart of method steps for determining values for a victim feedforward generator in a multi-actuator hard disk drive, according to an embodiment.

FIG. 6 sets forth a flowchart of method steps for determining values for a victim feedforward generator in a multi-actuator HDD, according to an embodiment. In the embodiment, a different set of values for the victim feedforward transfer function is determined for each magnetic head of the multi-actuator HDD. In some embodiments, the method steps are performed in HDD 100 as part of a calibration/start-up process. Although the method steps are described in conjunction with HDD 100 of FIGS. 1-5B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software-or firmware-implemented logic, and/or as hardware-implemented logic circuits.

A method 600 begins at step 601, when a suitable controller (i.e., microprocessor-based controller 133 and/or motor-driver chip 125) selects a victim read/write head 127 from the read/write heads associated with VCM 128A or VCM 128B. The selected read/write head 127 and associated actuator (either VCM 128A or VCM 128B) are then designated as the victim head and the victim actuator, respectively, while another actuator is designated as the aggressor actuator.

In step 602, the controller determines a first transfer function that models the radial position of the victim head as a function of a control signal applied to the aggressor actuator. In some embodiments, in an instance in which VCM 128A is the aggressor actuator and VCM 128B is the victim actuator, the first transfer function models radial position 405 of the currently active read/write head associated with VCM 128B as a function of VCM control signal 343 applied to VCM 128A. In one such embodiment, the first transfer function can model radial position 405 as a function of filtered VCM control signal 443, which is VCM control signal 343 after passing through notch filter 412. Alternatively, in another embodiment, the first transfer function models radial position 405 as a function of VCM control signal 447 prior to being processed by notch filter 412. One process by which the controller determines the first transfer function is described below in conjunction with FIG. 7.

In step 603, the controller determines a second transfer function that models the radial position of the victim head as a function of a feedforward signal added to the control signal that is applied to a microactuator 228 and/or 229 for positioning the victim head. For example, in an instance in which VCM 128A is the aggressor actuator and VCM 128B is the victim actuator, in some embodiments the second transfer function models radial position 405 of the currently active read/write head associated with VCM 128B as a function of victim feedforward signal 403 for microactuator 428B. One process by which the controller determines the second transfer function is described below in conjunction with FIG. 8.

In step 604, the controller determines a feedforward transfer function for the current victim head. The feedforward transfer function models a feedforward correction signal for the victim head as a function of a control signal supplied to the aggressor actuator. For example, in an instance in which VCM 128A is the aggressor actuator and VCM 128B is the victim actuator, in some embodiments the feedforward transfer function models victim feedforward signal 403 (the output of the feedforward transfer function) as a function of filtered VCM control signal 443 for VCM 128A (the input of the feedforward transfer function). In some embodiments, the controller determines a feedforward transfer function for the current victim head based on a ratio of the first transfer function determined for the victim head in step 602 and the second transfer function determined for the victim head in step 603. So that the feedforward transfer function substantially cancels the effect of filtered VCM control signal 443, the feedforward transfer function is multiplied by −1.

In step 605, the controller generates a victim feedforward kernel for the current victim head. In some embodiments, the victim feedforward kernel is based on the feedforward transfer function determined in step 604. For example, in one such embodiment, the controller generates a plurality of values for the victim feedforward kernel for the current victim head by determining an inverse discrete Fourier transform of values associated with the first transfer function. The controller then stores the plurality of values for the victim feedforward kernel in a memory of HDD 100, such as RAM 134 and/or flash memory device 135. Alternatively or additionally, the plurality of values can be programmed into one or more control algorithms of HDD 100.

In step 606, the controller determines whether there are any remaining read/write heads 127 in HDD 100 for which a feedforward transfer function is to be determined. If yes, method 600 returns to step 601; if no, method 600 proceeds to step 607 and terminates.

In some embodiments, a feedforward transfer function is determined not only for each different read/write head 127 of HDD 100, but also for each read/write head 127 at each of multiple temperature ranges. Thus, temperature variations in the mechanical coupling between a victim actuator and an aggressor actuator can be accurately accounted for. In such embodiments, a different iteration of method 600 is performed for each of the multiple temperature ranges. Thus, a different transfer function for the same read/write head 127 is determined for each of the different temperature ranges. For example, in one such embodiment, a different iteration of method 600 is performed for each of the following temperature ranges of HDD 100: −5° C. to +5° C.; +5° C. to +15° C.; +15° C. to +25° C.; +25° C. to +35° C. In other embodiments, a different iteration of method 600 is performed for any other temperature ranges, including larger temperature ranges than those described above, smaller temperature ranges than those described above, temperature ranges spanning different thermal ranges, etc. In other embodiments, a different iteration of method 600 is performed for one or more temperature ranges, and kernel values are determined for those temperature ranges, plus other temperature ranges, using methods of interpolation or extrapolation known to one of skill in the art.

In some embodiments, a feedforward transfer function is determined not only for each different read/write head 127 of HDD 100, but also for various radial locations of each read/write head 127. Thus, variations in the mechanical coupling between a victim actuator and an aggressor actuator that depend upon the radial location of the victim head can be accurately accounted for. In such embodiments, a different iteration of method 600 is performed for each of the multiple radial locations (e.g., proximate the ID, proximate the OD, and/or proximate a mid-diameter region). Thus, a different transfer function for the same read/write head 127 is determined for each of the different radial locations.

Figure 7:
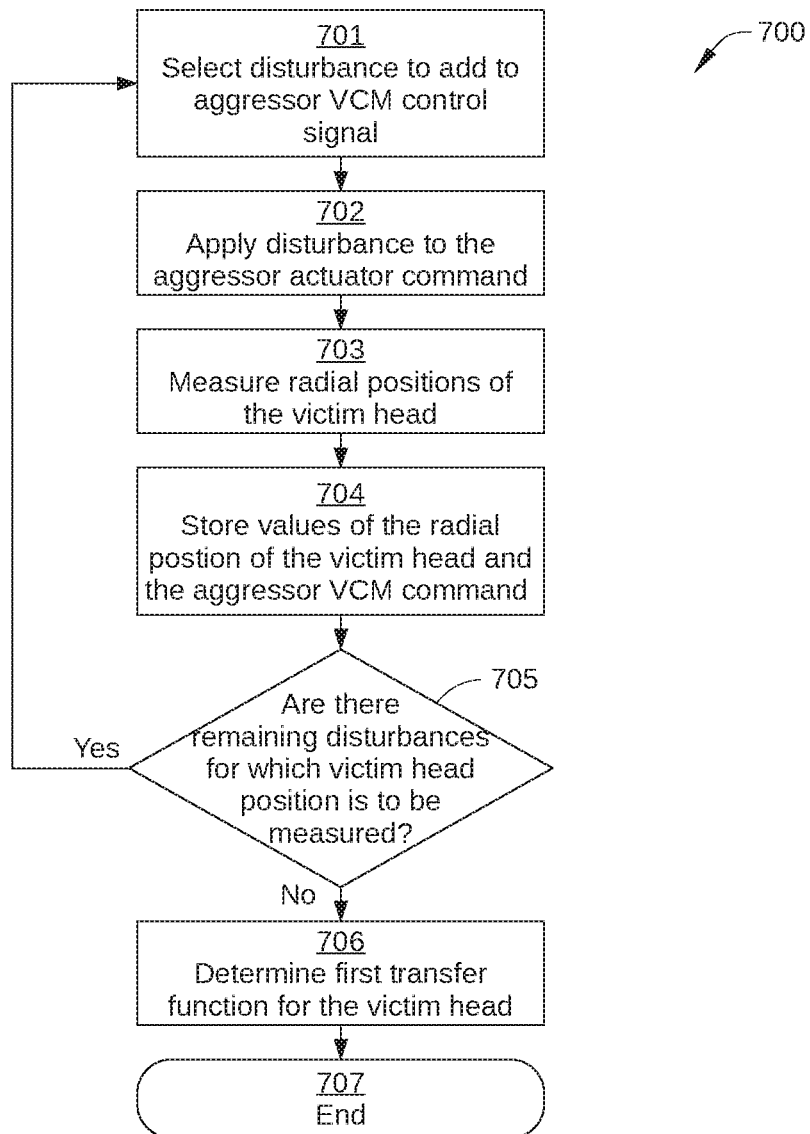
FIG. 7 sets forth a flowchart of method steps for determining a transfer function that models the radial position of a victim head as a function of a control signal applied to an aggressor actuator, according to an embodiment.

FIG. 7 sets forth a flowchart of method steps for determining a transfer function that models the radial position of a victim head as a function of a control signal applied to an aggressor actuator, according to an embodiment. For consistency with the description of method 600 in FIG. 6, such a transfer function is described herein as the "first transfer function." In some embodiments, the method steps are performed in HDD 100 as part of a calibration/start-up process. For example, the method steps of FIG. 7 may be implemented in step 602 of method 600. Although the method steps are described in conjunction with HDD 100 of FIGS. 1-5B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 700 begins at step 701, when a suitable controller (i.e., microprocessor-based controller 133 and/or motor-driver chip 125) selects a disturbance to be injected into or otherwise added to a control signal for an actuator that is currently designated as the aggressor actuator. For example, in an instance in which VCM 128A is the aggressor actuator and VCM 128B is the victim actuator, the controller selects a disturbance to be added to filtered VCM control signal 443 before being applied to VCM 128A. It is noted that VCM control signal 447 is generated as part of the closed loop servo control of the aggressor head and then modified to filtered VCM control signal 443. Generally, the controller selects the disturbance to be added to the VCM command from a plurality of disturbances that together facilitate the determination of the first transfer function. For example, the plurality of disturbances may include a range of different acceleration values that are each to be individually applied to the aggressor actuator during implementation of method 700.

In some embodiments, the plurality of disturbances is selected to excite the mechanical systems of first control loop 420 and second control loop 430 over all frequencies of interest. In this way, the first transfer function measured in method 700 more accurately captures the response of the mechanical and control systems of first control loop 420 and second control loop 430. In some embodiments, the different disturbances to be applied to VCM control signal 343 can be part of a sinusoidal waveform, a pulse of acceleration values, and/or selected from random noise. For example, in one embodiment, each disturbance to be applied to VCM control signal 343 is a sinewave of a different frequency. When each such disturbance is applied to VCM control signal 343, a complete spectrum of the first transfer function can be measured.

In some embodiments, a control signal for an aggressor actuator (e.g., VCM control signal 343) may be updated at the same rate at which the read/write head position 405 is determined for a victim actuator. Such systems are generally referred to as single-rate control systems. In other embodiments, a control signal for an aggressor actuator may be updated at a higher rate than the rate at which the read/write head position 405 is determined for the victim actuator. For example, in an embodiment, the control signal for an aggressor actuator might be updated at twice the rate at which the read/write head position 405 for the victim actuator is measured. Such systems are generally referred to as multi-rate control systems, and are known to one of skill in the art. For such systems, the relationship between the control signal for the aggressor actuator and the read/write head position 405 of the victim actuator can be represented by multiple transfer functions. For the example described above (in which VCM commands are updated at twice the rate at which the read/write head position is determined), the relationship between the aggressor control signal (e.g., VCM control signal 343) and the read/write head position (e.g., radial position 405) can be represented by two transfer functions; one transfer function between a signal that is made up of a first VCM control signal 343 that is sent to the aggressor VCM (VCM 128A) each servo sample and the victim's read/write head position 405, and a second transfer-function between a signal that is made up of a second VCM control signal 343 that is sent to the aggressor VCM (VCM 128A) each servo sample and the victim read/write head position (radial position 405). For such systems, the disturbances to be applied to VCM control signal 343 could include disturbances to only the first of the two control signals for each servo sample, disturbances to only the second of the two control signals, or to both simultaneously. For such systems, determining the two transfer-functions could involve measuring the aggressor VCM control signal 343 and the response of the victim read/write head position to two or more different disturbance signals, and simultaneously solving for the two transfer-functions, based upon the results of the multiple experiments. Such signal processing is known to one of skill in the art.

Continuing with the case of a multi-rate control system, the processing that was previously described for FIG. 6 is extended to apply to two first transfer functions. In step 602, the first transfer function would consist of two transfer functions. In step 604, determining the feed-forward transfer function for the victim head would consist of two transfer functions. In step 605, the victim feed-forward kernel would consist of two kernels; one which is applied to the first VCM control signal 343 that is applied to VCM 12A8 each servo sample, and another which is applied to the second VCM control signal 343 that is applied to VCM 128A each servo sample.

In step 702, the controller applies the selected disturbance to the VCM command for the aggressor VCM. For example, in an instance in which VCM 128A is the aggressor actuator and VCM 128B is the victim actuator, the disturbance is added to filtered VCM control signal 343 before VCM control signal 343 is applied to VCM 128A. In one such embodiment, the disturbance is added to filtered VCM control signal 443 at injection point 429.

In step 703, the controller measures the radial position of a read/write head 127 that is currently designated as the victim head. That is, the controller measures the response of the victim head (i.e., radial positions of the victim head over a certain time interval) to the disturbance applied in step 702. The controller also measures the VCM commands applied to the aggressor actuator. For example, in an instance in which VCM 128A is the aggressor actuator and VCM 128B is the victim actuator, the controller measures radial position 405 of the currently active read/write head associated with VCM 128B (i.e., the victim head), and the commands that were applied to the VCM 128A (i.e., VCM control signal 343). The commands applied to the aggressor actuator are collected in step 703 since such commands are not based solely on the selected disturbance applied in step 702; such commands include controller-determined feedback values as well.

In some embodiments, the controller performs steps 702 and 703 multiple times to reduce the influence of random noise and other non-repeatable runout on the measured radial position of the victim head. For example, the controller may perform steps 702 and 703 over a plurality of rotations of a storage disk 110. Alternatively or additionally, in some embodiments, the controller performs steps 702 and 703 at multiple circumferential locations of a recording surface 112 to reduce the influence of repeatable runout on the measured radial position of the victim head. In such embodiments, the controller may also perform steps 702 and 703 over a plurality of rotations of a storage disk 110.

In some embodiments, the effects of synchronous runout (also known as "written-in runout") on the accuracy of measurements of the first transfer function are reduced. In such embodiments, the measurements associated with steps 702 and 703 are made in pairs. In such embodiments, each pair of measurements is performed with added disturbances of equal amplitude and shape, but opposite sign, and with starting times that are separated by an integer number of revolutions of the storage disk 110. The difference between the resulting victim position (e.g., victim PES 405) for such a pair of experiments should, to first order, be devoid of effects of synchronous runout, which might otherwise degrade the accuracy of the transfer-function measurement. The difference between the resulting commands that were applied to the aggressor actuator should similarly be, to first order, devoid of effects of synchronous runout.

In step 704, the controller stores the values of the measured position of the victim head over the time extent of the experiment, and stores the values of the commands that were applied to the aggressor actuator over that same time extent. In some embodiments, the values stored are based on multiple measurements made when the controller performs steps 702 and 703 multiple times.

In step 705, the controller determines whether there are any remaining disturbances for which a resultant radial position of the victim head is to be measured. If yes, method 700 returns to step 701; if no, method 700 proceeds to step 706.

In step 706, the controller derives the first transfer function for the victim head based on the values stored over the multiple iterations of step 704. In some embodiments, the transfer function is determined as the ratio of the spectrum of the victim measured position to the spectrum of the commands applied to the aggressor actuator. Method 700 then proceeds to step 707 and terminates.

Figure 8:
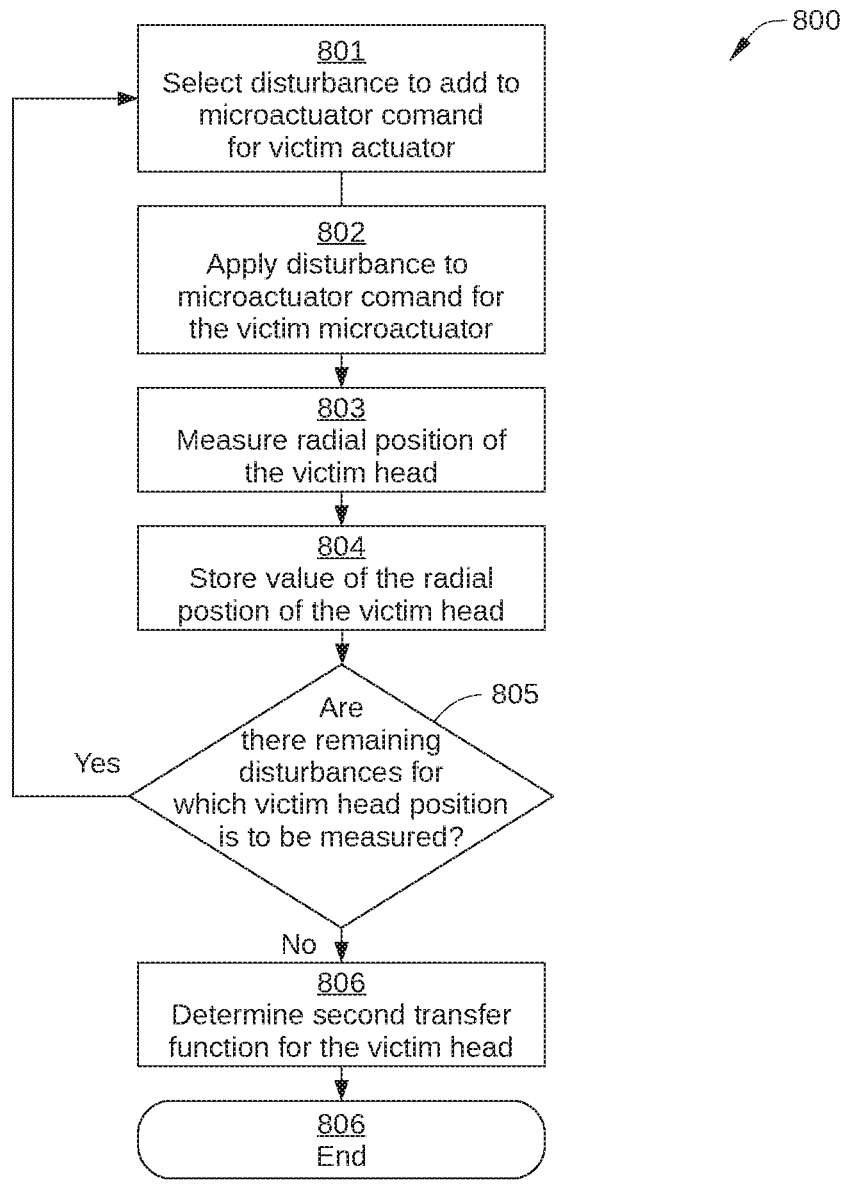
FIG. 8 sets forth a flowchart of method steps for determining a transfer function that models the radial position of a victim head as a function of a disturbance added to a control signal that is applied to a microactuator for positioning the victim head, according to an embodiment.

FIG. 8 sets forth a flowchart of method steps for determining a transfer function that models the radial position of a victim head as a function of a disturbance added to a control signal that is applied to a microactuator for positioning the victim head, according to an embodiment. For consistency with the description of method 600 in FIG. 6, the transfer function is described herein as the "second transfer function." In some embodiments, the method steps are performed in HDD 100 as part of a calibration/start-up process. For example, the method steps of FIG. 8 may be implemented in step 603 of method 600. Although the method steps are described in conjunction with HDD 100 of FIGS. 1-5B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software-or firmware-implemented logic, and/or as hardware-implemented logic circuits.

A method 800 begins at step 801, when a suitable controller (i.e., microprocessor-based controller 133 and/or motor-driver chip 125) selects a disturbance (or microactuator control signal) for a microactuator that is configured to position a read/write head 127 currently designated as the victim head. For example, in an instance in which VCM 128A is the aggressor actuator and VCM 128B is the victim actuator, the controller selects a disturbance to microactuator control signal 345, which is to be applied to microactuator 428B. Generally, the controller selects the disturbance from a plurality of disturbances that together facilitate the determination of the second transfer function. For example, the plurality of microactuator commands may include a range of different acceleration values that are each to be individually applied to the microactuator during implementation of method 800. In some embodiments, the different disturbances to be applied to microactuator control signal 345 can be part of a sinusoidal waveform, a pulse of acceleration values, and/or selected from random noise. For example, in one embodiment, each disturbance to be applied to microactuator control signal 345 is a sinewave of a different frequency. Further, any of the other techniques described above in conjunction with method 700 for measuring the first transfer function can be employed for measuring the second transfer function in method 800.

In step 802, the controller adds the selected disturbance to the microactuator control signal for positioning the victim head. For example, in an instance in which VCM 128A is the aggressor actuator and VCM 128B is the victim actuator, the disturbance is added to microactuator control signal 345, which is then applied to microactuator 428B. In the embodiment illustrated in FIG. 4A, the disturbance can be injected between second servo controller 316 and notch filter 421. In the embodiment illustrated in FIG. 4B, the disturbance can be injected between notch filter 421 and microactuator 428B. In some embodiments, the selected disturbance is modified by a notch filter before being applied to the microactuator, and in other embodiments, the selected disturbance is modified by a second filtering portion of a notch filter before being applied to the microactuator.

In step 803, the controller measures the radial position of a read/write head 127 that is currently designated as the victim head. For example, in an instance in which VCM 128A is the aggressor actuator and VCM 128B is the victim actuator, the controller measures radial position 405 of the currently active read/write head associated with VCM 128B (i.e., the victim head).

In some embodiments, the controller performs steps 802-804 multiple times to reduce the influence of random noise and other non-repeatable runout on the measured radial position of the victim head. For example, the controller may perform steps 802-804 over a plurality of rotations of a storage disk 110.

In step 804, the controller stores the value of the measured position of the victim head over the time extent of the experiment. In some embodiments, the value stored is based on multiple measurements made when the controller performs steps 802 and 803 multiple times.

In step 805, the controller determines whether there are any remaining disturbances for which a resultant radial position of the victim head is to be measured. If yes, method 800 returns to step 801; if no, method 800 proceeds to step 806.

In step 806, the controller derives the second transfer function for the victim head based on the values stored over the multiple iterations of step 804. In some embodiments, the transfer function is determined as the ratio of the spectrum of the victim measured position to the spectrum of the added disturbance. Method 800 then proceeds to step 807 and terminates.

Figure 9:
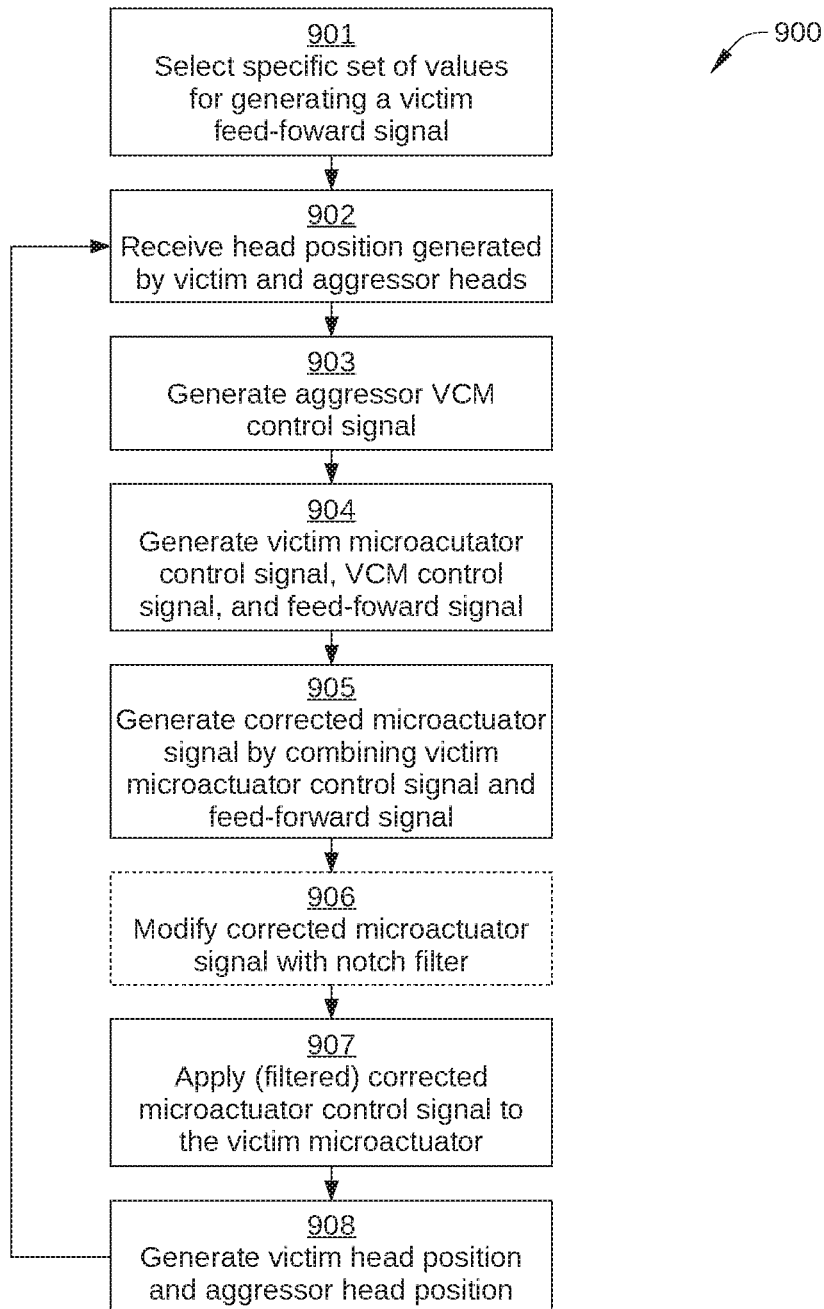
FIG. 9 sets forth a flowchart of method steps for controlling magnetic head position in a multi-actuator hard disk drive, according to an embodiment.

FIG. 9 sets forth a flowchart of method steps for controlling magnetic head position in a multi-actuator HDD, according to an embodiment. In some embodiments, the method steps are performed in HDD 100 during normal operation of HDD 100. Although the method steps are described in conjunction with HDD 100 of FIGS. 1-8, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software-or firmware-implemented logic, and/or as hardware-implemented logic circuits.

Prior to the method steps, values for a victim feedforward generator 383 of HDD 100 are determined, such as via method 600 of FIG. 6. For example, in an embodiment in which HDD 100 includes N read/write heads 127, where N is a positive integer, at least N sets of values are determined and stored for use by victim feedforward generator 383. In the embodiment, each set of values corresponds to a kernel that is derived from a feedforward transfer function for a different read/write head 127. Thus, victim feedforward generator 383 can generate a different victim feedforward signal to a victim microactuator depending on which of the N read/write heads 127 of HDD 100 is currently the victim head.

In some embodiments, prior to the method steps, M sets of values, where M is a positive integer, are determined and stored for use by victim feedforward generator 383 for each of the N read/write heads 127. For example, in one such embodiment, each of the M different sets of values for a particular read/write head 127 corresponds to a different temperature range in which HDD 100 may operate and for which a different victim feedforward transfer function is applicable. Thus, in the embodiment, victim feedforward generator 383 can generate M different victim feedforward signals 403 for a single read/write head 127, depending on the temperature range in which HDD 100 is operating at the time. Alternatively or additionally, in some embodiments, prior to the method steps, K sets of values, where K is a positive integer, are determined and stored for use by victim feedforward generator 383 for each of the N read/write heads 127. For example, in one such embodiment, each of the K different sets of values for a particular read/write head 127 corresponds to a different radial location of the victim head. Thus, in the embodiment, victim feedforward generator 383 can generate K different victim feedforward signals 403 for a single read/write head 127, depending on the radial location of the victim head at the time. Further, in some embodiments, victim feedforward generator 383 can generate K×M different victim feedforward signals 403 for a single read/write head 127, depending on the radial location of the victim head and the temperature range in which HDD 100 is operating at the time.

A method 900 begins at step 901, when a suitable controller (i.e., microprocessor-based controller 133 and/or motor-driver chip 125) determines a specific set of values to be retrieved from a memory by victim feedforward generator 383 to generate an appropriate victim feedforward signal 403. For purposes of discussion below, the specific set of values to be retrieved from a memory by victim feedforward generator 383 to generate an appropriate victim feedforward signal will be referred to as a victim feedforward kernel. The controller then retrieves the specific set of values from the appropriate memory of HDD 100.

The controller determines the specific set of values based on which of the N read/write heads 127 of HDD 100 is currently designated to be the victim head. Additionally, in some embodiments, the controller determines the specific set of values further based on which of M different predetermined temperature ranges HDD 100 is currently operating in. Additionally or alternatively, in some embodiments, the controller determines the specific set of values further based on which of K different radial locations the victim head currently occupies. Thus, in some embodiments, the controller determines the specific set of values from N different sets of values; in other embodiments, the controller determines the specific set of values from N×M different sets of values; in other embodiments, the controller determines the specific set of values from N×K different sets of values; and in yet other embodiments, the controller determines the specific set of values from N×M×K different sets of values. In yet other embodiments, the controller may determine the set of values based upon a combination of one or more of the up to N×M×K different sets of values, using interpolation between two or more sets of values, based upon temperature range, victim location, or other operating parameters.

In some embodiments, all of the disk surfaces associated with actuator arm assembly 120A (for example, recording surfaces 112A-112D in FIG. 2) are servo-written in such a manner that the servo samples are aligned in time. In other words, a servo wedge on surface 112A passes under read/write head 227A at about the same time that a servo wedge on surface 112B passes under read/write head 227B, and so on. For this reason, the timing of commands sent to VCM 128A (as part of the response of first servo controller 315 to the measured position of any read/write head associated with that VCM) should be relatively independent of which read/write head is currently under servo control. In such a case, it is not necessary to have a different victim feedforward kernel for each individual combination of aggressor and victim head, because all aggressor heads can be treated similarly. When the servo wedges for different heads associated with a single actuator are not aligned in time, then it may be necessary to have a different victim feedforward kernel for each combination of aggressor and victim head.

In step 902, the controller receives or determines a radial position generated by the victim head, such as radial position 405. Generally, the controller receives or determines the PES as the victim head passes over a servo wedge on a recording surface 112 of HDD 100. In addition, the controller measures the radial position of a read/write head 127 that is currently designated as the aggressor head. For example, in an instance in which VCM 128A is the aggressor actuator and VCM 128B is the victim actuator, the controller measures PES of the currently active read/write head associated with VCM 128A. The PES for the aggressor head is employed to enable the aggressor servo loop to function.

In step 903, the controller generates an aggressor actuator control signal for moving the aggressor actuator of HDD 100. The controller generates the aggressor actuator control signal based on aggressor head PES received in step 902. That is, the PES received in step 902 for the aggressor head is for a different read/write head than the victim read/write head. In instances in which VCM 128B is the aggressor actuator and VCM 128A is the victim actuator, the controller generating the aggressor actuator control signal corresponds to second servo controller 316.

In step 904, the controller generates a microactuator control signal and a VCM control signal for the victim actuator based on the radial position 405 received or determined in step 901. In addition, the controller generates a victim feedforward signal (e.g., victim feedforward signal 403) based on the aggressor actuator control signal generated in step 903 and on the set of values selected in step 901. The set of values is derived from the appropriate feedforward transfer function for the victim head. Generally, the feedforward transfer function models commands to be added to the microactuator control signal as a function of the aggressor actuator control signal generated in step 903, as well as recent previous values of that aggressor actuator control signal, e.g., the J most recent values of the aggressor actuator control signal.

In some embodiments, for a particular read/write head 127, victim feedforward signal 403 is generated using the feedforward kernel for that particular read/write head 127. In one such embodiment, a value for the victim feedforward signal is calculated using Equation 1:

$$victimFF(j) = \sum_{k=0}^{J-1} Kernel(k) * VCMCMD(j-k) \quad (1)$$

where victimFF(j) is the $j^{th}$ (current) value of victim feedforward signal 403 for the particular read/write head 127, Kernel(k) is the kth kernel element, and VCMCMD(j) is the $j^{th}$ VCM command. The integer J is the number of kernel elements that are included in the kernel for the particular read/write head 127. In some embodiments, J is selected so that kernel elements past Kernel(J−1) are very small. That is, generally, Kernel(j) begins with a particular magnitude (that can vary significantly from one sample to the next), and, over time, Kernel(j) gradually gets smaller (though possibly with increasing and decreasing oscillations). Thus, once sample, #J, is reached, Kernel(j) typically approaches zero.

For the case of a multi-rate control system (for example one in which the VCM control signal 343 is updated at twice the rate at which the victim's read/write head radial position 405 is determined), the formula could be extended to Equation 2:

$$victimFF(j) = \sum_{k=0}^{J-1} Kernel_0(k) * VCMCMD_0(j-k) + \\ \sum_{k=0}^{J-1} Kernel_1(k) * VCMCMD_1(j-k) \quad (2)$$

Where $VCMCMD_0(j)$ is the $j^{th}$ value of the first VCM-CMD of each servo sample, $VCMCMD_1(j)$ is the $j^{th}$ value of the second VCM command of each servo sample, $Kernel_0(k)$ is the kth kernel element (applied to first VCM commands), and $Kernel_1(k)$ is the kth kernel element (applied to the second VCM commands). In such a system, it is possible that the victim feedforward signal 403 could be determined once per sample of the victim's read/write radial position, while the output of the Notch filter (for example Notch Filter 451) could be updated twice per sample. So-called multi-rate notch filters are known to one of skill in the art.

In some embodiments that include a multi-rate control system, the victim feedforward signal can be determined at the same rate as that of the aggressor VCM command, using a single convolution, as shown in Equation 3 (for the example in which the VCM control signal 343 is updated at twice the rate at which the victim's read/write radial position 405 is determined):

$$victimFF2X(j) = \sum_{k=0}^{2J-1} Kernel2X(k) * VCMCMD2X(j-k) \quad (3)$$

where VCMCMD2X(2j) is the $j^{th}$ value of the first VCM command of each servo-sample, VCMCMD2X(2j+1) is the $j^{th}$ value of the second VCM command of each servo-sample, Kernel2X(2k) is the $k^{th}$ kernel element applied to first VCM commands, and Kernel2X(2k+1) is the $k^{th}$ kernel element applied to the second VCM commands. In such an embodiment, two victim feedforward signal values are determined for each servo sample. In some embodiments, Equation 3 may be considered a simpler implementation than Equation 2, since Equation 3 involves a single summation. However, Equation 3 involves roughly twice as many multiply-accumulate operations) as Equation 2. Because Equation 3 is associated with determining two victim feedforward signals per servo sample, in embodiments in which Equation 3 is implemented, the victim feedforward signal may be conditioned so as to minimize the excitation of high-frequency mechanical resonances, potentially obviating the need to pass the feedforward signal through a notch filter (for example, Notch Filter 451) before sending the feedforward signal to the microactuator 428B.

In step 905, the controller combines the microactuator control signal and the victim feedforward signal generated in step 904 to produce a corrected microactuator signal.

In optional step 906, a notch filter modifies the corrected microactuator signal to produce a filtered corrected microactuator signal for the victim microactuator. In some embodiments, the corrected microactuator signal passes through all portions of the notch filter, whereas in other embodiments, the corrected microactuator signal does not pass through all filtering portions of the notch filter. In the latter case, the corrected microactuator signal passes through a filtering portion of the notch filter that is configured to reduce, block, or otherwise attenuate one or more high-frequency bands that are above a feedforward frequency threshold. In another embodiment, the feedforward signal is processed by a different notch-filter, and is added to the filtered victim microactuator control signal after their respective notch filters.

In step 907, the filtered corrected microactuator control signal is applied to the victim microactuator, which adjusts the radial position of the victim head accordingly.

In step 908, the victim head generates radial position 405 as the victim head passes over the next servo wedge and the aggressor head generates a PES as the aggressor head passes over the next servo wedge. Method 900 then returns back to step 901.

Implementation of method 900 enables a suitable victim feedforward signal to be determined and added to a microactuator for a victim head, thereby reducing or eliminating the effect of aggressor actuator motion on the positioning accuracy of the victim head.

While the foregoing is directed to embodiments of the present invention, other and further embodiments of the invention may be devised without departing from the basic scope thereof, and the scope thereof is determined by the claims that follow.

We claim:

1. A disk drive comprising:
 a magnetic disk;
 first and second heads;
 a first microactuator configured to move the first head relative to the magnetic disk;
 a second microactuator configured to move the second head relative to the magnetic disk;
 a first arm to which the first head and the first microactuator are mounted;
 a second arm to which the second head and the second microactuator are mounted;
 a first controller configured to generate a first control signal for moving the first arm and a second control signal for the first microactuator, in response to a first position signal generated by the first head;
 a second controller configured to generate a third control signal for moving the second arm and a fourth control signal for the second microactuator, in response to a second position signal generated by the second head;
 a third controller configured to generate a feedforward correction signal for modifying the second control signal; and
 a notch filter between the first microactuator and the first controller, the notch filter configured to generate a fifth control signal for the first microactuator from the second control signal and the feedforward correction signal,
 wherein the feedforward correction signal is generated based on a first transfer function that models the feedforward correction signal as a function of the third control signal.

2. The disk drive of claim 1, wherein the first transfer function is derived based on a second transfer function that models the radial position of the first head as a function of the second control signal and a third transfer function that models a radial position of the first head as a function of the third control signal.

3. The disk drive of claim 2, wherein the first transfer function is derived based on a ratio of the second transfer function and the third transfer function.

4. The disk drive of claim 2, wherein the second transfer function is derived based on a measurement of the radial position of the first head in response to a specific value of the second control signal.

5. The disk drive of claim 2, wherein the second transfer function is derived based on a measurement of a plurality of radial positions of the first head, each radial position occurring in response to a respective different value being added to the second control signal.

6. The disk drive of claim 2, wherein the third transfer function is derived based on a measurement of the radial position of the first head in response to a specific value being added to the third control signal.

7. The disk drive of claim 1, wherein the notch filter includes a first portion and a second portion, and the fifth control signal is generated from the second control signal that passes through the first and second portions of the notch filter and the feedforward correction signal that passes through only the second portion of the notch filter.

8. The disk drive of claim 7, wherein the first transfer function is derived based on a second transfer function that models the radial position of the first head as a function of an input signal to the second portion of the notch filter and a third transfer function that models a radial position of the first head as a function of the third control signal.

9. The disk drive of claim 7, wherein the first portion of the notch filter is configured to attenuate a low-frequency band of an input signal and the second portion of the notch filter is configured to attenuate a high-frequency band of the input signal.

10. The disk drive of claim 7, wherein the low-frequency band is less than a feedforward frequency threshold and the high-frequency band is greater than the feedforward frequency threshold.

11. A method of manufacturing a disk drive including
   a magnetic disk;
   first and second heads;
   a first microactuator configured to move the first head relative to the magnetic disk;
   a second microactuator configured to move the second head relative to the magnetic disk;
   a first arm that is coupled to a first voice coil motor (VCM) and to which the first head and the first microactuator are mounted;
   a second arm that is coupled to a second VCM and to which the second head and the second microactuator are mounted;
   a first controller configured to generate a first control signal for moving the first arm and a second control signal for the first microactuator in response to a first position signal generated by the first head;
   a second controller configured to generate a third control signal for moving the second arm and a fourth control signal for the second microactuator, in response to a second position signal generated by the second head;
   a third controller configured to generate a feedforward correction signal for modifying the second control signal; and
   a notch filter between the first microactuator and the first controller, the notch filter configured to generate a fifth control signal for the first microactuator from the second control signal and the feedforward correction signal,
said method comprising:
   determining a first transfer function that models the feedforward correction signal as a function of the third control signal; and
   modifying the third controller to generate the feedforward correction signal based on the first transfer function.

12. The method of claim 11, wherein modifying the third controller to generate the feedforward correction signal comprises storing values based on the first transfer function in a memory of the drive.

13. The method of claim 12, further comprising generating the values based on the first transfer function by determining an inverse discrete Fourier transform of values associated with the first transfer function.

14. The method of claim 11, wherein the first transfer function is derived based on a second transfer function that models a first radial position of the first head as a function of the second control signal and a third transfer function that models a second radial position of the first head as a function of the third control signal.

15. The method of claim 14, wherein the first transfer function is derived based on a ratio of the second transfer function and the third transfer function.

16. The method of claim 14, further comprising:
   measuring the first radial position in response to a first specific value being added to the second control signal at a first time; and
   determining the second transfer function based on the measuring of the first radial position.

17. The method of claim 16, further comprising:
   measuring the first radial position in response to a second specific value being added to the second control signal,
   wherein the second specific value is equal but opposite in sign to the first specific value and is added to the second control signal at a second time that is separated from the first time by an integer number of revolutions of the magnetic disk, and
   wherein determining the second transfer function based on the measuring of the first radial position comprises determining the second transfer function based on the measuring of the first radial position in response to the first specific value being added to the second control signal and in response to the second specific value being added to the second control signal.

18. The method of claim 14, further comprising:
   measuring the second radial position in response to a first specific value being added to the third control signal at a third time; and
   determining the third transfer function based on the measuring of the second radial position.

19. The method of claim 18, further comprising:
   measuring the second radial position in response to a second specific value being added to the third control signal,
   wherein the second specific value is equal but opposite in sign to the first specific value and is added to the third control signal at a second time that is separated from the first time by an integer number of revolutions of the magnetic disk, and
   wherein determining the third transfer function based on the measuring of the first radial position comprises determining the third transfer function based on the measuring of the first radial position in response to the first specific value being added to the third control signal and in response to the second specific value being added to the third control signal.

20. The method of claim 11, further comprising:
   determining a second transfer function that models a feedforward correction signal for modifying a sixth control signal as a function of the third control signal, wherein the first controller is further configured to generate the sixth control signal for a third microactuator in response to a second position signal generated by the third head; and
   modifying the third controller to generate the feedforward correction signal for modifying the sixth control signal based on the second transfer function.

* * * * *